United States Patent
Tsuruya

(10) Patent No.: US 7,532,488 B2
(45) Date of Patent: May 12, 2009

(54) DC CONVERTER

(75) Inventor: Mamoru Tsuruya, Niiza (JP)

(73) Assignee: Sanken Electric Co., Ltd. (JP)

( * ) Notice: Subject to any disclaimer, the term of this patent is extended or adjusted under 35 U.S.C. 154(b) by 212 days.

(21) Appl. No.: 10/531,797

(22) PCT Filed: Oct. 21, 2003

(86) PCT No.: PCT/JP03/13411

§ 371 (c)(1),
(2), (4) Date: Apr. 18, 2005

(87) PCT Pub. No.: WO2004/036726

PCT Pub. Date: Apr. 29, 2004

(65) Prior Publication Data

US 2006/0104097 A1 May 18, 2006

(30) Foreign Application Priority Data

Oct. 21, 2002 (JP) ............................. 2002-306250
Nov. 5, 2002 (JP) ............................. 2002-321105

(51) Int. Cl.
*H02M 3/335* (2006.01)

(52) U.S. Cl. ...................................... 363/21.03; 363/97

(58) Field of Classification Search ............. 363/16–20, 363/21.1, 21.2–21.18, 86, 88–89, 95, 97, 363/131; 323/222, 224
See application file for complete search history.

(56) References Cited

U.S. PATENT DOCUMENTS

| | | | | |
|---|---|---|---|---|
| 4,975,821 A | * | 12/1990 | Lethellier | 363/21.02 |
| 5,126,931 A | * | 6/1992 | Jitaru | 363/21.04 |
| 5,570,278 A | * | 10/1996 | Cross | 363/20 |
| 5,790,389 A | * | 8/1998 | Hua | 363/20 |
| 5,995,385 A | * | 11/1999 | Shimamura | 363/21.16 |
| 6,278,621 B1 | * | 8/2001 | Xia et al. | 363/21.06 |

FOREIGN PATENT DOCUMENTS

| | | |
|---|---|---|
| JP | 04-299064 A | 10/1992 |
| JP | 05-236739 A | 9/1993 |
| JP | 06-022548 | 1/1994 |
| JP | 2000-341947 A | 12/2000 |
| JP | 2002-78339 A | 3/2002 |
| WO | WO 95/23452 | 8/1995 |

* cited by examiner

*Primary Examiner*—Rajnikant B Patel
(74) *Attorney, Agent, or Firm*—Kilpatrick Stockton LLP

(57) ABSTRACT

A primary winding 5a of a transformer T and a switch Q1 are connected in series with a DC power source Vdc1. A series circuit composed of a switch Q2 and a snubber capacitor C3 is connected in parallel with the primary winding or the switch Q1. A saturable reactor SL1 is connected in parallel with the primary winding 5a. A series circuit composed of a diode D1 and a capacitor C4 is connected in parallel with a secondary winding 5b of the transformer T, to form a rectifying/smoothing circuit. A control circuit 10 turns on and off the switches Q1 and Q2 alternately and turns off the switch Q2 when a current to the switch Q2 increases.

41 Claims, 33 Drawing Sheets

DC CONVERTER

TECHNICAL FIELD

The present invention relates to a high-efficiency, small, low-noise DC converter.

BACKGROUND TECHNOLOGY

FIG. 1 is a circuit diagram showing a DC converter of this type according to a related art. In the DC converter shown in FIG. 1, a DC power source Vdc1 is connected through a primary winding 5a (the number of turns being n1) of a transformer T to a main switch Q1 which may be a MOSFET (hereinafter referred to as FET). Both ends of the primary winding 5a are connected to a parallel circuit, which is composed of a resistor R2 and a snubber capacitor C2, and a diode D3 connected in series with the parallel circuit. The main switch Q1 is turned on and off under PWM control by a control circuit 100.

The primary winding 5a and a secondary winding 5b of the transformer T are wound so as to generate in-phase voltages. The secondary winding 5b (the number of turns being n2) of the transformer T is connected to a rectifying/smoothing circuit composed of diodes D1 and D2, a reactor L1, and a capacitor C4. The rectifying/smoothing circuit rectifies and smoothes a voltage (on/off-controlled pulse voltage) induced on the secondary winding 5b of the transformer T and provides a DC output for a load RL.

The control circuit 100 has an operational amplifier (not shown) and a photocoupler (not shown). The operational amplifier compares an output voltage of the load RL with a reference voltage. If the output voltage of the load RL is equal to or greater than the reference voltage, the ON-width of a pulse applied to the main switch Q1 is controlled to be narrower. Namely, when the output voltage of the load RL becomes equal to or greater than the reference voltage, the ON-width of a pulse applied to the main switch Q1 is narrowed to maintain a constant output voltage.

Operation of the DC converter with the above-mentioned configuration will be explained with reference to a timing chart shown in FIG. 2. In FIG. 2, the main switch Q1 has a terminal voltage Q1v, passes a current Q1i, and is on/off-controlled according to a Q1-control signal.

At time t31, the Q1-control signal turns on the main switch Q1, and the DC power source Vdc1 passes the current Q1i through the primary winding 5a of the transformer T to the main switch Q1. This current linearly increases as time passes up to time t32. The primary winding 5a passes a current n1i that linearly increases as time passes up to time t32, like the current Q1i.

Between time t31 and time t32, the primary winding 5a is negative on the main switch Q1 side, and the primary winding 5a and secondary winding 5b are in-phase. Accordingly, an anode of the diode D1 is positive to pass a current in order of 5b, D1, L1, C4, and 5b.

Next, at time t32, the main switch Q1 is changed from the ON state to an OFF state according to the Q1-control signal. At this time, among induced energy on the primary winding 5a of the transformer T, the induced energy of a leakage inductance Lg (inductance not coupled with the secondary winding 5b) is not transferred to the secondary winding 5b and is accumulated in the snubber capacitor C2 through the diode D3.

Between time t32 and time t33, the main switch Q1 is OFF, and therefore, the current Q1i and the current n1i passing through the primary winding 5a become zero. Between time t32 and time t33, a current is passed in order of L1, C4, D2, and L1 to supply power to the load RL.

This DC converter inserts the snubber circuit (C2, R2) to relax a temporal change in the voltage of the main switch Q1, thereby reducing switching noise and suppressing a surge voltage from the leakage inductance Lg of the transformer T to the main switch Q1.

DISCLOSURE OF INVENTION

The DC converter of FIG. 1, however, increases a loss because charge accumulated in the snubber capacitor C2 is consumed by the resistor R2. This loss is proportional to a conversion frequency. If the conversion frequency is increased to reduce the size of the DC converter, the loss increases and the efficiency decreases.

A transformer excitation current to the primary winding 5a of the transformer T linearly positively increases as shown in FIG. 4 when the main switch Q1 is ON and linearly decreases to zero when the main switch Q1 is OFF. Namely, magnetic flux of the transformer T uses only the first quadrant (ΔB') of a B-H curve, to decrease the usage rate of a core of the transformer T and increase the size of the transformer T.

The present invention provides a DC converter that is capable of reducing the size of a transformer and realizing zero-voltage switching and is small, highly efficient, and low in noise.

A first technical aspect of the present invention provides a DC converter including a first series circuit connected in parallel with a DC power source and involving a primary winding of a transformer and a first switch that are connected in series, a saturable reactor connected in parallel with the primary winding of the transformer, a first return circuit connected to the first series circuit and composed of a second switch and a snubber capacitor that are connected in series, to return energy accumulated in the saturable reactor, a rectifying/smoothing circuit connected in parallel with a secondary winding of the transformer and composed of a rectifying element and a smoothing element, and a control circuit to turn on and off the first and second switches alternately.

According to a second technical aspect of the present invention, the DC converter of the first technical aspect further includes a power supply source to accumulate power when the first switch is ON and supply the power to the snubber capacitor when the first switch is OFF. The first return circuit is connected in parallel with any one of the first switch and primary winding. The control circuit turns off the second switch when a current to the second switch increases.

According to a third technical aspect of the present invention, the DC converter of the first technical aspect connects the first switch of the first series circuit through a third reactor to the primary winding and further includes a second return circuit connected to the transformer, to return energy accumulated in the third reactor to the secondary side of the transformer.

According to a fourth technical aspect of the present invention, the DC converter of the first technical aspect further includes a power supply source to accumulate power when the first switch is ON and supplies the power to the snubber capacitor when the first switch is OFF, connects the first return circuit in parallel with any one of the first switch and primary winding, and includes in the rectifying/smoothing circuit a second rectifying element connected in parallel with the secondary winding of the transformer through the rectifying element and a fourth reactor connected between the rectifying element and the smoothing element. The control circuit turns off the second switch when a current to the second switch increases.

According to a fifth technical aspect of the present invention, the DC converter of the first technical aspect includes a power supply source to accumulate power when the first switch is ON and supplies the power to the snubber capacitor when the first switch is OFF, connects the first return circuit in parallel with any one of the first switch and primary winding, and includes in the rectifying/smoothing circuit a fourth reactor connected between the smoothing element and the secondary winding of the transformer, a third switch connected in parallel with the rectifying element and having a control terminal connected to a second end of the secondary winding, a fourth switch connected in parallel with the series circuit of the third switch and secondary winding and having a control terminal connected to a first end of the secondary winding, and a second rectifying element connected in parallel with the secondary winding of the transformer through the third switch. The control circuit turns off the second switch when a current to the second switch increases.

BRIEF DESCRIPTION OF DRAWINGS

FIG. 8 is a timing chart showing signals at various parts of the DC converter according to the first embodiment when a switch Q1 is turned on;

FIG. 21 is a timing chart showing signals at various parts of the DC converter according to the fourth embodiment when a switch Q1 is turned on;

FIG. 32 is a timing chart showing signals at various parts of the DC converter according to the eighth embodiment when a switch Q1 is turned on;

BEST MODE OF IMPLEMENTATION

DC converters according to embodiments of the present invention will be explained in detail with reference to the drawings.

First Embodiment

A DC converter according to a first embodiment directly supplies power to a load from a secondary winding of a transformer when a main switch is turned on and accumulates induced energy accumulated in a primary winding of the transformer when the main switch is turned off. When an auxiliary switch is turned on, the first and third quadrants of the B-H curve of a core of the transformer are used, and a shortage of excitation energy is supplemented from a power supply source so that the start of the B-H curve is brought to a lower end of the third quadrant. The primary winding of the transformer is connected in parallel with a saturable reactor. The saturable reactor is saturated just before the end of an ON period of the auxiliary switch, to increase a current and steeply generate a reverse voltage when the auxiliary switch is turned off. This results in making the main switch perform a zero-voltage switching operation.

The secondary side of the transformer T is provided with a rectifying/smoothing circuit composed of a diode D1 and a capacitor C4.

Figure 5:
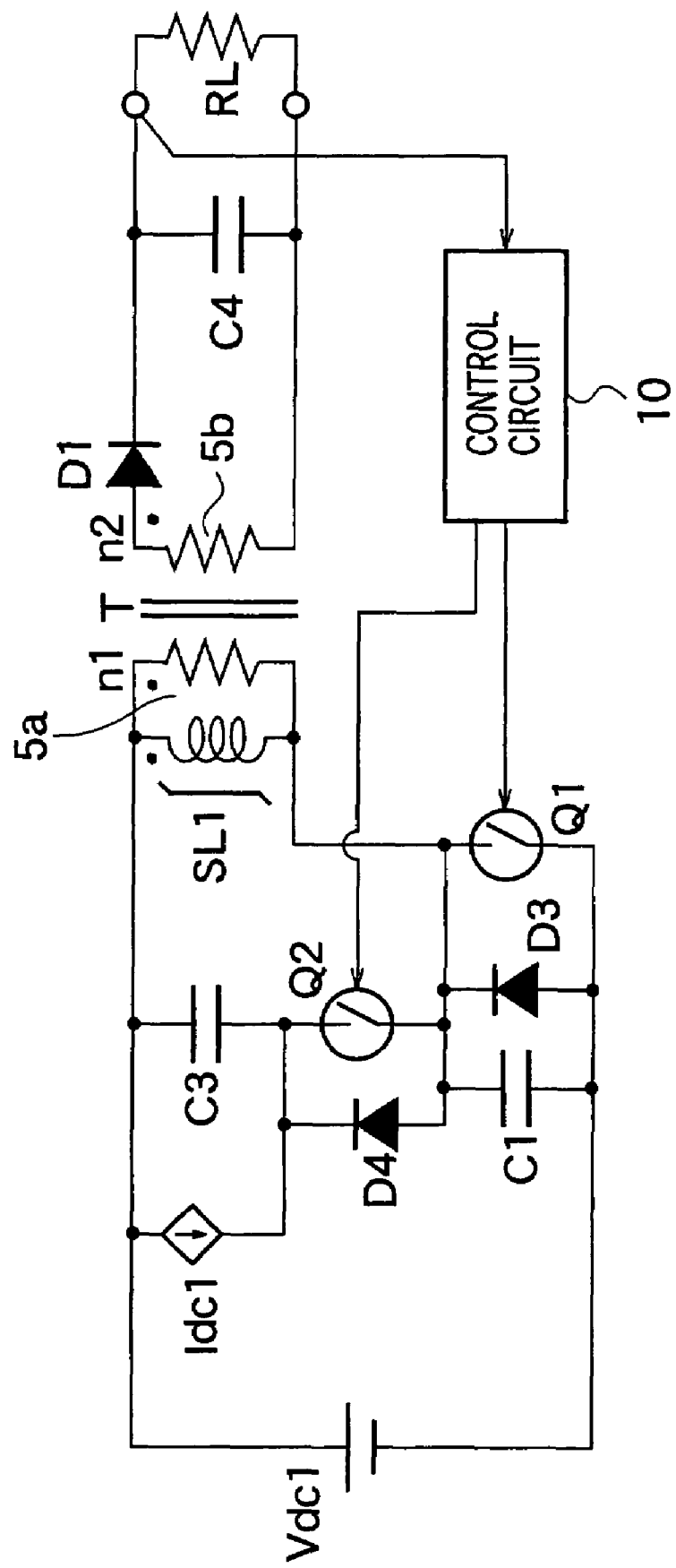
FIG. 5 is a circuit diagram showing a DC converter according to a first embodiment.

FIG. 5 is a circuit diagram showing the DC converter according to the first embodiment. In the DC converter shown in FIG. 5, both ends of a Dc power source Vdc1 are connected to a series circuit (first series circuit) including a primary winding 5a (the number of turns being n1) of the transformer T and a switch Q1 (first switch) made of a FET and serving as a main switch. Both ends of the switch Q1 are connected in parallel with a diode D3 and a resonant capacitor C1.

A node between a first end of the primary winding 5a of the transformer T and a first end of the switch Q1 is connected to a first end of a switch Q2 (second switch) made of a FET and serving as an auxiliary switch. A second end of the switch Q2 is connected through a snubber capacitor C3 to a positive electrode of the DC power source Vdc1. A series circuit composed of the snubber capacitor C3 and switch Q2 forms a first return circuit. The second end of the switch Q2 may be connected through the snubber capacitor C3 to a negative electrode of the DC power source Vdc1.

Both ends of the snubber capacitor C3 are connected to a power supply source Idc1 made of a current source that accumulates power when the switch Q1 is ON and supplies the accumulated power to the snubber capacitor C3 when the switch Q1 is OFF.

Both ends of the switch Q2 are connected in parallel with a diode D4. The switches Q1 and Q2 are alternately turned on and off under PWM control by a control circuit 10 and have a period (dead time) in which both of them are OFF.

The primary winding 5a of the transformer T is connected in parallel with a saturable reactor SL1. The saturable reactor SL1 employs the saturation characteristic of a core of the transformer T. The saturable reactor SL1 passes an AC current with equal positive and negative amplitudes. Accordingly, magnetic flux increases and decreases equally in the first and third quadrants around an origin (B, H)=(0, 0) on a B-H curve shown in FIG. 9.

Since the circuit involves a loss, the magnetic flux is not completely symmetrical, and the first quadrant mainly works. To quickly discharge the capacitor C1 to realize a zero voltage, the saturable reactor SL1 or the excitation inductance of the transformer T is lowered to increase an excitation current.

Figure 9:
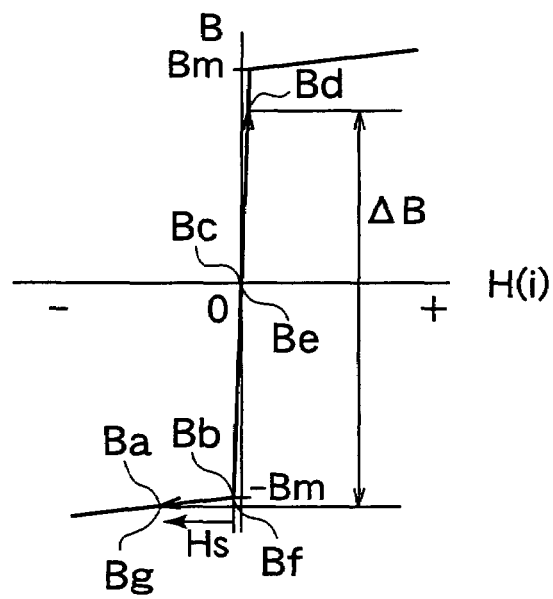
FIG. 9 is a view showing the B-H characteristic of the transformer arranged in the DC converter according to the first embodiment.

As shown in FIG. 9, magnetic flux B saturates at Bm with respect to a given positive magnetic field H and at −Bm with respect to a given negative magnetic field H. A magnetic field H occurs in proportion to the magnitude of a current i. Accurately, "B" is a magnetic flux density, and magnetic flux $\phi$ is expressed as $\phi=B\cdot S$ where S is a sectional area of the core. For the convenience of explanation, S=1 and $\phi=B$. In the saturable reactor SL1, magnetic flux B moves along the B-H curve in order of Ba, Bb, Bc, Bd, Be, Bf, and Bg. Namely, the operation range of the magnetic flux is wide. A section Ba-Bb and a section Bf-Bg on the B-H curve are in a saturated state.

Around the core of the transformer T, there are wound the primary winding 5a and a secondary winding 5b (the number of turns being n2) whose phase is the same as that of the primary winding. A first end of the secondary winding 5b is connected to an anode of the diode D1. A cathode of the diode D1 and a second end of the secondary winding 5b are connected to the capacitor C4. The diode D1 and capacitor C4 form the rectifying/smoothing circuit. The capacitor C4 smoothes a rectified voltage of the diode D1 and provides a DC output to the load RL.

The control circuit 10 turns on and off the switches Q1 and Q2 alternately. The control circuit 10 narrows the ON-width of a pulse applied to the switch Q1 and widens the ON-width of a pulse applied to the switch Q2 when the output voltage of the load RL is equal to or above a reference voltage. Namely, when the output voltage of the load RL becomes equal to or greater than the reference voltage, the ON-width of a pulse to the switch Q1 is narrowed to maintain a constant output voltage.

Figure 8:
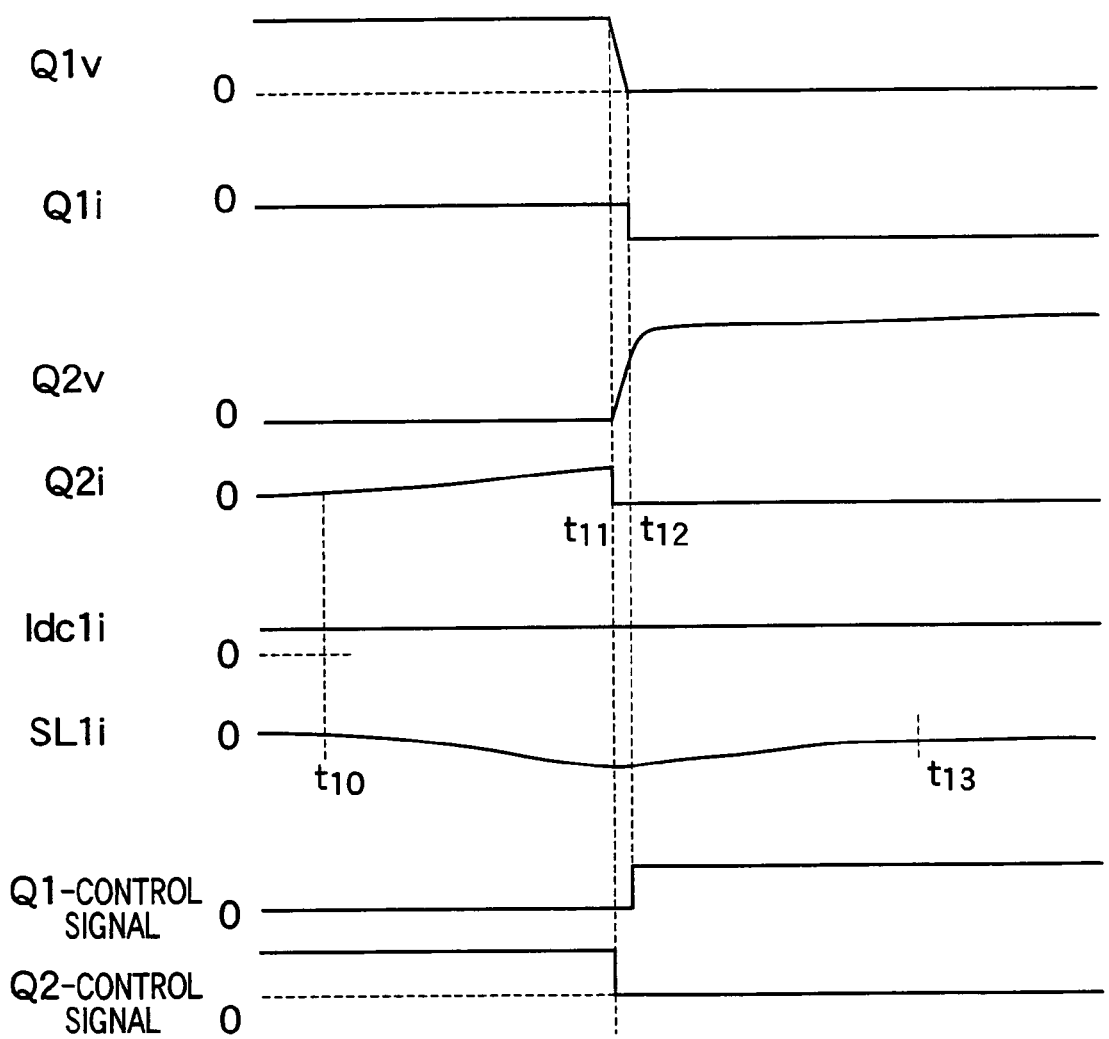

As shown in FIG. 8, the control circuit 10 turns off the switch Q2 when a current Q2i to the switch Q2 increases, and then, turns on the switch Q1. The control circuit 10 turns on the switch Q1 within a predetermined period after the time when the voltage of the switch Q1 becomes zero due to resonance between the resonant capacitor C1, which is connected in parallel with the switch Q1, and the saturation inductance of the saturable reactor SL1.

Figure 6:
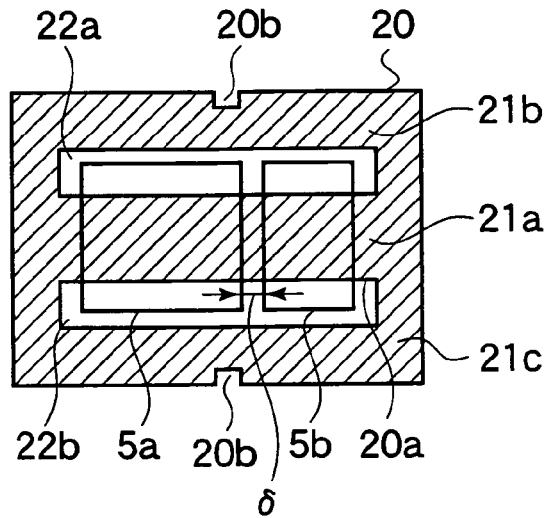
FIG. 6 is a structural view showing a transformer arranged in the DC converter according to the first embodiment.

FIG. 6 is a structural view showing the transformer arranged in the DC converter according to the first embodiment. The transformer shown in FIG. 6 has a core 20 having a rectangular external shape. The core 20 has elongated gaps 22a and 22b to form magnetic paths 21a, 21b, and 21c, the gaps 22a and 22b being extended in parallel with the length of the magnetic paths. Around a core part 20a of the core 20, the primary winding 5a and secondary winding 5b are wound. To provide a leakage inductor, the primary winding 5a and secondary winding 5b are dividedly wound.

Two recesses 20b are formed on an outer circumferential core, opposite to a space between the primary winding 5a and the secondary winding 5b. The recesses 20b partly reduce the cross-sectional areas of the magnetic paths 21b and 21c in the outer circumferential core. Only the reduced parts magnetically saturate, to reduce a core loss when the primary winding 5a serves as the saturable reactor SL1.

Figure 7:
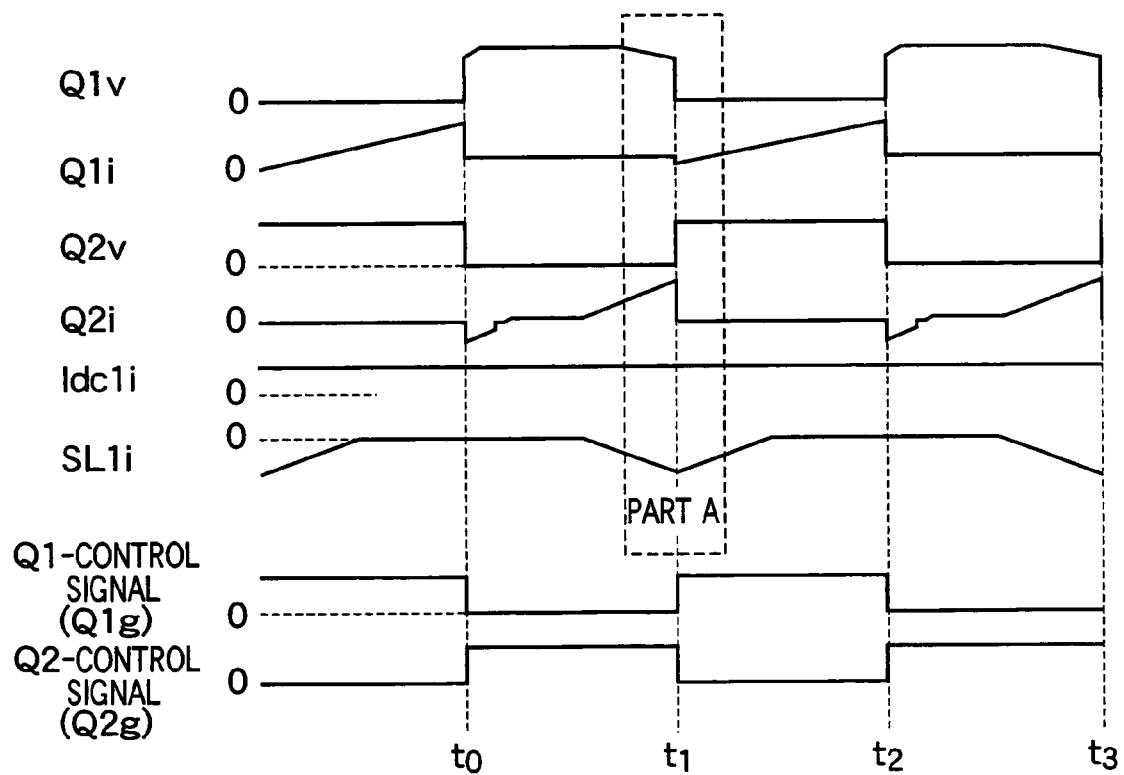
FIG. 7 is a timing chart showing signals at various parts of the DC converter according to the first embodiment.

Operation of the DC converter according to the first embodiment with the above-mentioned configuration will be explained with reference to timing charts of FIGS. 7, 8, and 10. The timing chart of FIG. 7 shows signals at various parts of the DC converter according to the first embodiment. The timing chart of FIG. 8 shows the same signals of the DC converter according to the first embodiment when the switch Q1 is turned on. FIG. 9 shows the B-H characteristic of the transformer in the DC converter according to the first embodiment. The timing chart of FIG. 10 shows a current to the saturable reactor in the DC converter according to the first embodiment.

FIGS. 7 and 8 show a terminal voltage Q1v of the switch Q1, a current Q1i passed to the switch Q1, a terminal voltage Q2v of the switch Q2, a current Q2i passed to the switch Q2, a current Idc1i passed to the power supply source Idc1, and a current SL1i passed to the saturable reactor SL1.

At time t1 (corresponding to t11 to t12), the switch Q1 is turned on. Then, a current passes in order of Vdc1, 5a, Q1, and Vdc1. At the same time, the secondary winding 5b of the transformer T generates a voltage to pass a current in order of 5b, D1, C4, and 5b. When the switch Q1 is turned on, the saturable reactor SL1 passes a current SL1i to accumulate energy in the inductor of the saturable reactor SL1.

Figure 10:
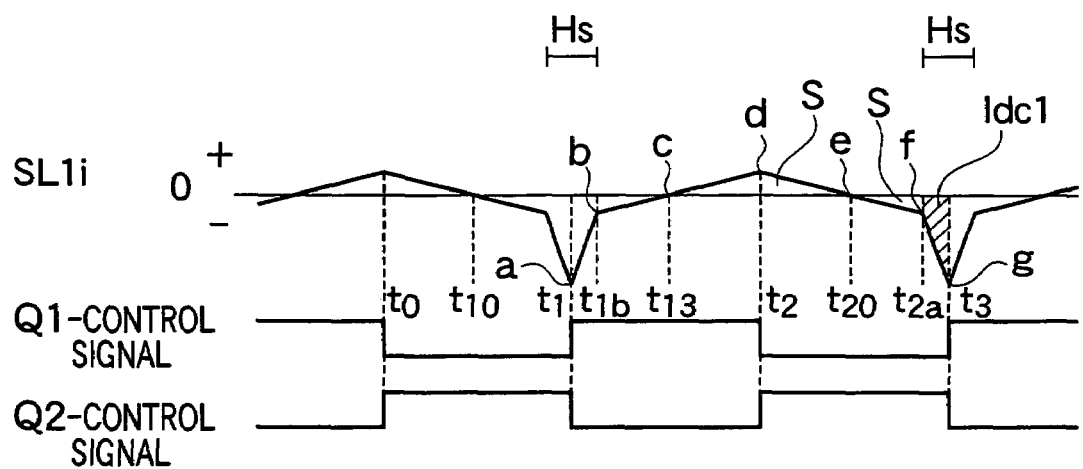
FIG. 10 is a timing chart showing a current to a saturable reactor arranged in the DC converter according to the first embodiment.

The current SL1i changes, as shown in FIG. 10, to a current value a (negative value) at time t1, to a current value b (negative value) at time t1b, to a current value c (zero) at time t13, and to a current value d (positive value) at time t2. On the B-H curve shown in FIG. 9, magnetic flux changes in order of Ba, Bb, Bc, and Bd. An operation range ΔB of magnetic flux according to the present invention is as shown in FIG. 9, and the B-H curve has a saturation region Hs. Ba to Bg shown in FIG. 9 temporally correspond to a to g shown in FIG. 10.

At time t2, the switch Q1 is turned off. Then, the energy accumulated in the saturable reactor SL1 charges the capacitor C1. At this time, the inductance of the saturable reactor SL1 and the capacitor C1 form a voltage resonance, to steeply increase the voltage of the capacitor C1, i.e., the voltage Q1v of the switch Q1.

When the potential of the capacitor C1 becomes equal to the potential of the capacitor C3, the discharge of energy of the saturable reactor SL1 makes the diode D4 conductive to pass a diode current that charges the capacitor C3. At this time, the switch Q2 is turned on so that the switch Q2 becomes a zero-voltage switch. From time t2 to time t20, the current SL1i changes from the current value d (positive value) to a current value e (zero). Accordingly, on the B-H curve, magnetic flux changes from Bd to Be.

Simultaneously with the energy discharge of the saturable reactor SL1, energy from the power supply source Idc1 is supplied to the capacitor C3 to charge the capacitor C3. Namely, the capacitor C3 cumulatively receives both the energy from the power supply source Idc1 and the energy from the saturable reactor SL1. Upon the completion of the energy discharge of the saturable reactor SL1 and the energy discharge of the power supply source Idc1, the charging of the capacitor C3 stops.

From time t20 to time t3, the energy accumulated in the capacitor C3 flows in order of C3, Q2, SL1, and C3 to reset the magnetic flux of the saturable reactor SL1. The magnetic flux of the transformer T that is connected in parallel with the saturable reactor SL1 similarly changes.

From time t20 to time t3, the energy accumulated in the capacitor C3 is returned to the saturable reactor SL1, and therefore, the current SL1i passed through the saturable reactor SL1 becomes negative as shown in FIG. 10. Namely, the current SL1i changes from the current value e (zero) to a current value f (negative value) in the period from t20 to t2a. As a result, on the B-H curve shown in FIG. 9, magnetic flux changes from Be to Bf. An area S from time t2 to time t20 is equal to an area S from time t20 to time t2a. The area S corresponds to the energy of the saturable reactor SL1 accumulated in the capacitor C3.

From time t2a to time t3, the current SL1i changes from the current value f (negative value) to a current value g (negative value). On the B-H curve shown in FIG. 9, magnetic flux changes from Bf to Bg in the saturation region Hs. An area from time t2a to time t3 corresponds to the energy of the power supply source Idc1 accumulated in the capacitor C3.

Namely, the energy accumulated in the capacitor C3 is the sum of the energy of the saturable reactor SL1 and the energy of the power supply source Idc1, and therefore, the current SL1i is increased by the energy supplied from the power supply source Idc1 at the time of resetting. As a result, magnetic flux moves to the third quadrant to reach the saturation region (Bf to Bg) to increase the current SL1i, which becomes the maximum at time t3 (like at time t1). The current SL1i increases to a saturation current of the saturable reactor SL1 just before the end of the ON period of the switch Q2.

At time t3, the current Q2i of the switch Q2 reaches the maximum. At this time, the switch Q2 is turned off to steeply discharge the capacitor C1, which quickly becomes zero. At this time, the switch Q1 is turned on to achieve zero-voltage switching.

Figure 11:
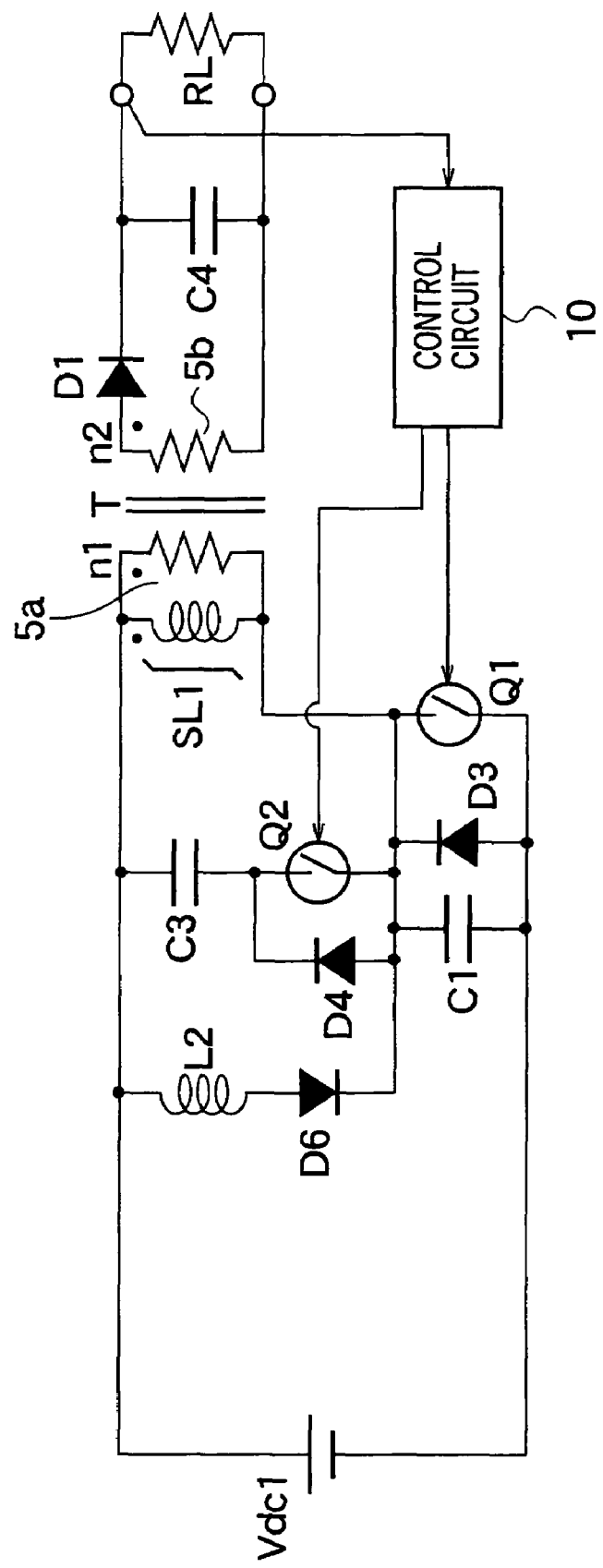
FIG. 11 is a circuit diagram showing a first example of the DC converter according to the first embodiment.

FIG. 11 is a circuit diagram showing the details of the DC converter according to the first embodiment. The first embodiment shown in FIG. 11 forms the power supply source Idc1 from a series circuit (second series circuit) composed of a reactor (first reactor) L2 and a diode D6.

According to this embodiment, the reactor L2 accumulates energy when the switch Q1 is turned on, and when the switch Q1 is turned off, the energy accumulated in the reactor L2 is supplied to the capacitor C3 to charge the capacitor C3. The power supply source Idc1 shown in FIG. 11 is appropriate for light load.

First Modification

Figure 12:
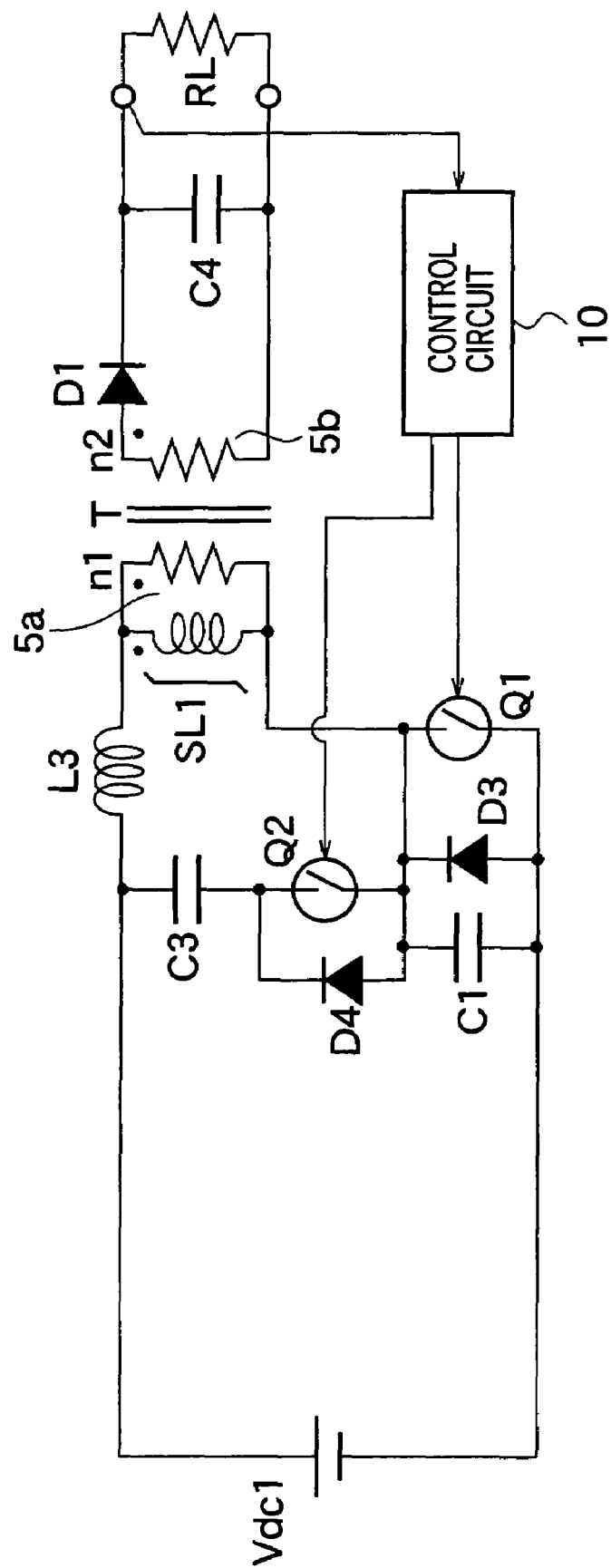
FIG. 12 is a circuit diagram showing a first modification of the DC converter according to the first embodiment.

FIG. 12 is a circuit diagram showing a first modification of the DC converter according to the first embodiment. The first modification shown in FIG. 12 forms the power supply source Idc1 from a reactor (second reactor) L3 that is connected in series with the primary winding 5a of the transformer T.

According to the first modification, the switch Q1 is turned on to pass a current through the reactor L3 and accumulate energy in the reactor L3. When the switch Q1 is turned off, the energy is discharged in order of L3, T, D4, C3, and L3. The energy is partly supplied through the secondary winding 5b of the transformer T to the load RL and is partly supplied to the capacitor C3 to charge the capacitor C3. The power supply source Idc1 shown in FIG. 12 is appropriate for heavy load.

Second Modification

Figure 13:
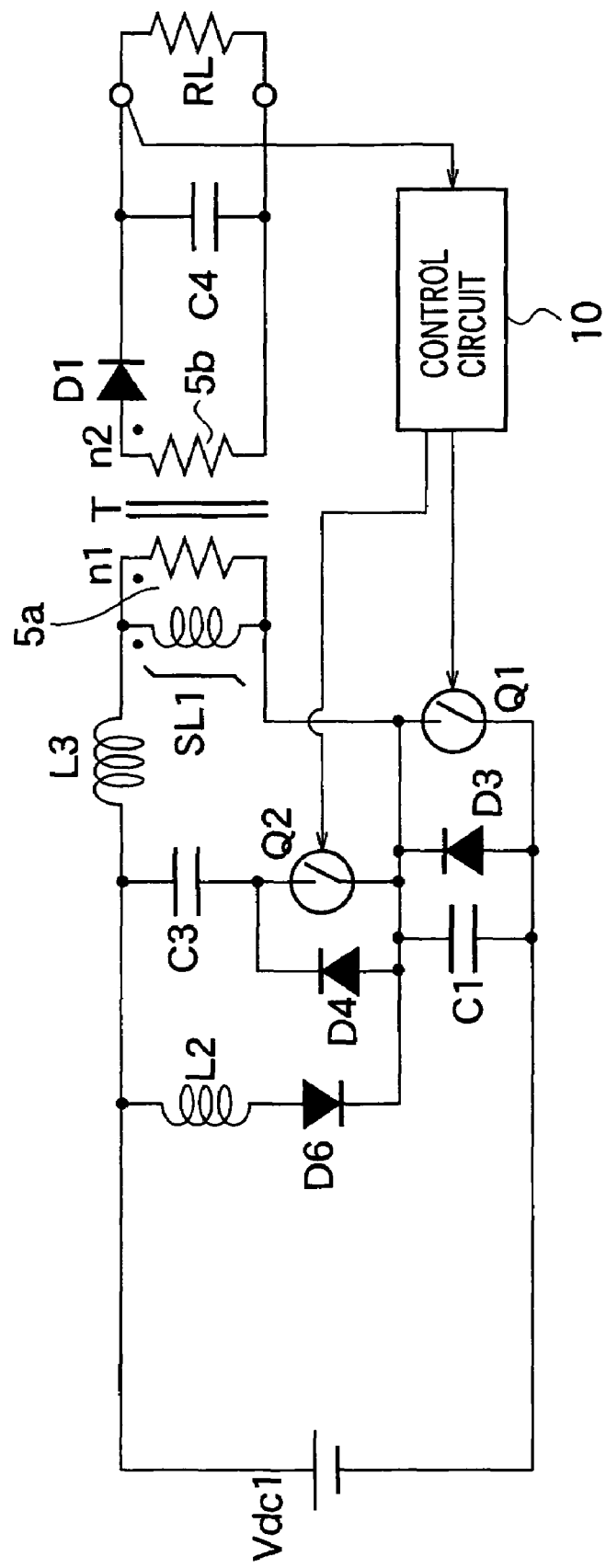
FIG. 13 is a circuit diagram showing a second modification of the DC converter according to the first embodiment.

FIG. 13 is a circuit diagram showing a second modification of the DC converter according to the first embodiment. The second modification shown in FIG. 13 combines the reactor L2 and diode D6 serving as the power supply source Idc1 of FIG. 11 with the reactor L3 serving as the power supply source Idc1 of FIG. 12, to cope with light load and heavy load.

The reactor L3 may be replaced with a leakage inductor of the transformer T. The saturable reactor SL1 may be replaced with an excitation inductance of the transformer T if the transformer employs the core of FIG. 6 with a good saturation characteristic. This circuit can control an output voltage with a fixed switching frequency to perform PWM control, thereby easily coping with a broadcasting interference and the like.

As explained above, the embodiment can achieve zero-voltage switching, relax the rise and fall of voltage due to a resonant action, and realize a low-noise, high-efficiency DC converter.

In addition, the embodiment can improve the flux use ratio of a transformer core and reduce the size of the DC converter.

Second Embodiment

Figure 14:
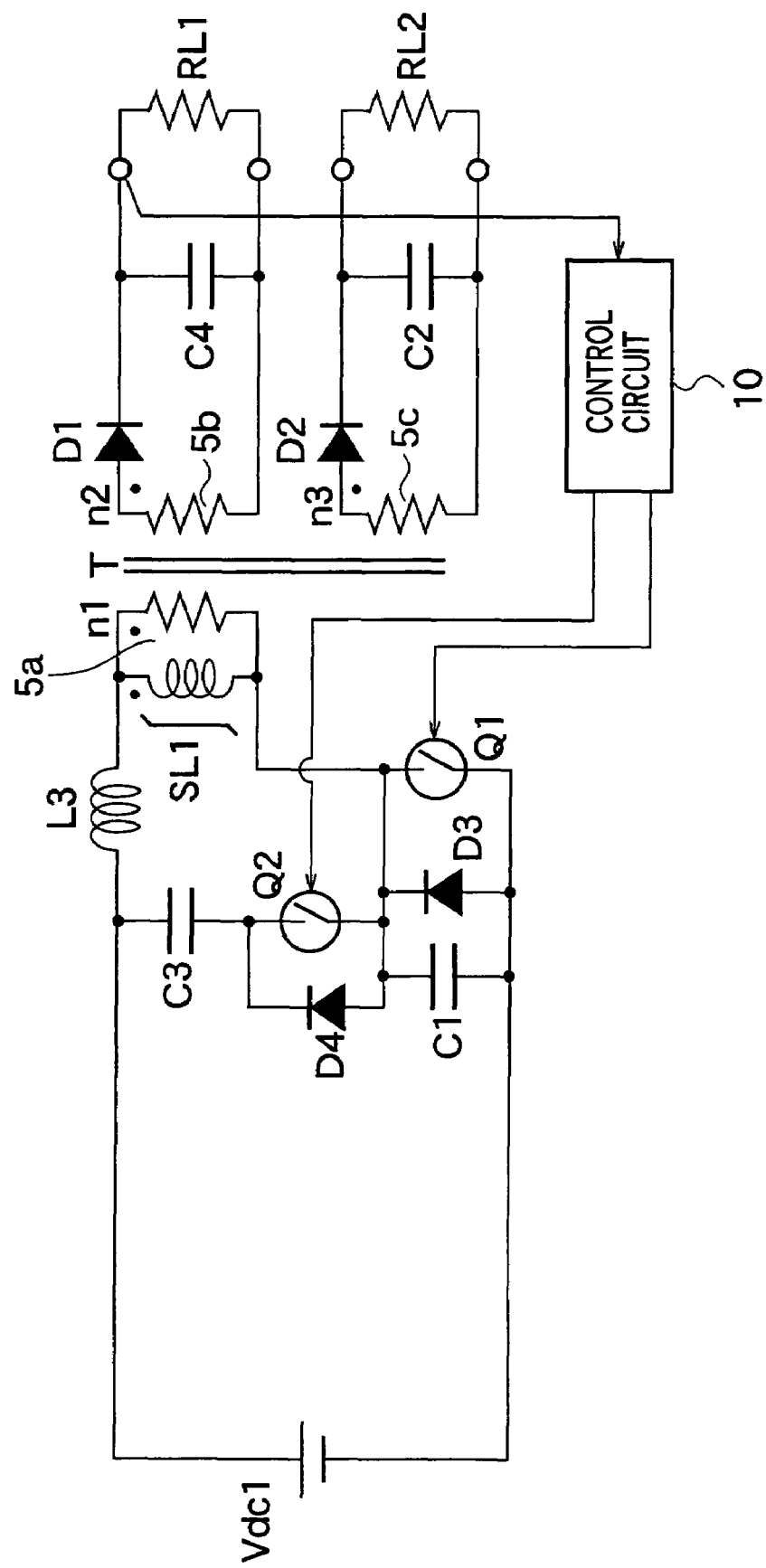
FIG. 14 is a circuit diagram showing a DC converter according to a second embodiment.

FIG. 14 is a circuit diagram showing a DC converter according to a second embodiment. The DC converter according to the second embodiment employs a secondary winding 5b and a tertiary winding 5c on the secondary side of a transformer T, to provide two outputs. The secondary side of the transformer T may have three or more windings to provide three or more outputs. Only the two-output configuration will be explained.

The DC converter of this embodiment uses, in addition to the DC converter of FIG. 12, the tertiary winding 5c wound around the core of the transformer T, a diode D2, a capacitor C2, and a load RL2. The tertiary winding 5c and secondary winding 5b are in-phase. A first end of the tertiary winding 5c is connected to an anode of the diode D2, and a cathode of the diode D2 and a second end of the tertiary winding 5c are connected to the capacitor C2. The diode D2 and capacitor C2 form a rectifying/smoothing circuit. The capacitor C2 smoothes a rectified voltage of the diode D2 and provides a DC output to the load RL2.

The primary winding 5a and secondary winding 5b are loosely coupled, and the primary winding 5a and tertiary winding 5c are loosely coupled. For example, the windings are separated from each other to realize the coarse coupling. The secondary winding 5b and tertiary winding 5c are tightly coupled. For example, these windings are brought closer to each other to realize the dense coupling.

A control circuit 10 turns on and off a switch Q1 and a switch Q2 alternately. When an output voltage of a load RL1 becomes equal to or larger than a reference voltage, the ON-width of a pulse applied to the switch Q1 is narrowed and the ON-width of a pulse applied to the switch Q2 is widened. Namely, when an output voltage of the load RL1 becomes equal to or greater than the reference voltage, the ON-width of a pulse to the switch Q1 is narrowed to maintain output voltages at respective constant values.

A circuitry on the primary side of the transformer T is the same as that of the first modification of the first embodiment. Namely, a power supply source Idc1 is made of a reactor L3 that is connected in series with the primary winding 5a of the transformer T.

In the DC converter according to the second embodiment, a voltage from the secondary winding 5b is rectified and smoothed with the diode D1 and capacitor C4, to supply DC power to the load RL1. A voltage from the tertiary winding 5c is rectified and smoothed with the diode D2 and capacitor C2, to supply DC power to the load RL2.

The primary winding 5a and secondary winding 5b are loosely coupled, and therefore, a leakage inductor on the primary side is large. The secondary winding 5b and tertiary winding 5c are tightly coupled, and therefore, a leakage inductor on the secondary side is small. As a result, a secondary output (the output of the secondary winding and the output of the tertiary winding) involves small variations with respect to light load and heavy load, to realize a good load variation characteristic. This improves a cross regulation on the secondary side. Since a satisfactory cross regulation is achieved among the plurality of outputs, auxiliary regulators can be omitted to realize a simple circuitry.

Figure 1:
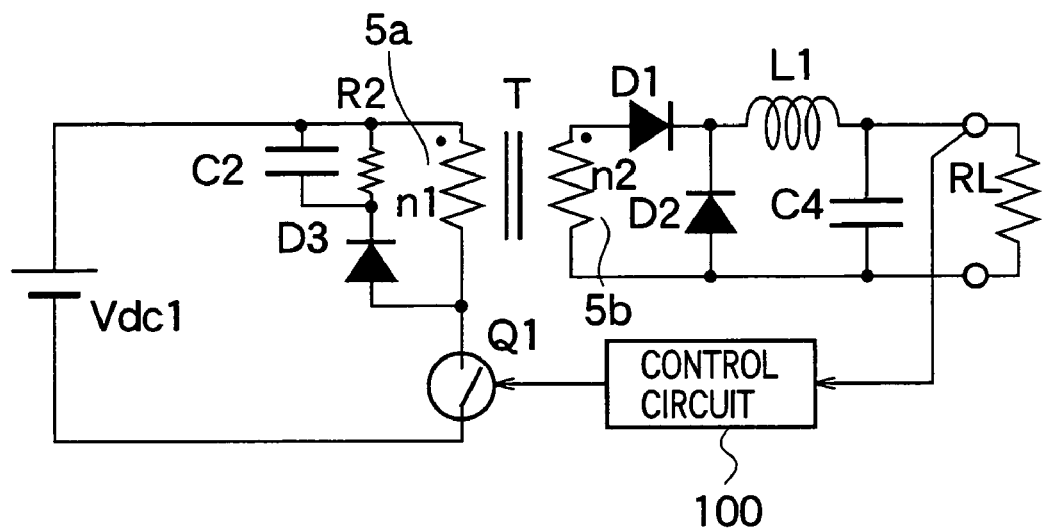
FIG. 1 is a circuit diagram showing a DC converter according to a related art.
Figure 2:
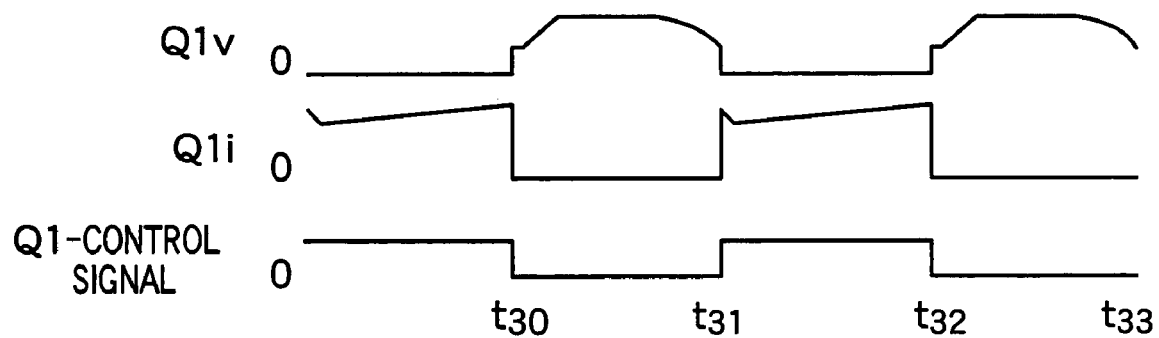
FIG. 2 is a timing chart showing signals at various parts of the DC converter of the related art.
Figure 3:
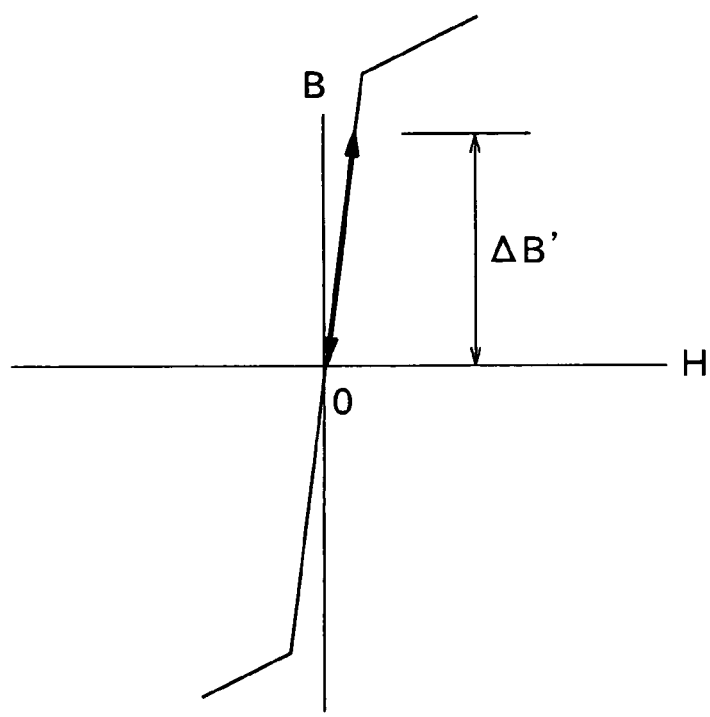
FIG. 3 is a view showing the B-H characteristic of a transformer arranged in the DC converter of the related art.
Figure 4:
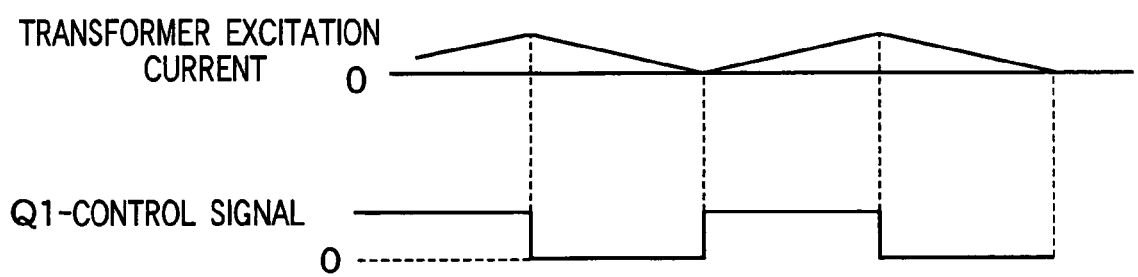
FIG. 4 is a timing chart showing an excitation current to the transformer arranged in the DC converter of the related art.

To provide a plurality of outputs on the secondary side, another DC converter (not shown) may be embodied based on the DC converter of FIG. 14 added with a secondary circuitry (a tertiary winding 5c, diodes D3 and D4, a reactor L2, and a capacitor C2) that is the same as the secondary circuitry (the secondary winding 5b, diodes D1 and D2, reactor L1, and capacitor C4) of the DC converter shown in FIG. 1.

Since the reactors L1 and L2 are large, they may be wound around the same core. This, however, worsens a cross regulation on the secondary side. Matching a turn ratio of the secondary winding 5b and reactor L1 with a turn ratio of the tertiary winding 5c and reactor L2 is difficult because the numbers of turns are small.

The second embodiment shown in FIG. 14 does not employ the reactors L1 and L2. A leakage inductor on the secondary side is small, and a leakage inductance between the primary side and the secondary side is large. This improves a cross regulation on the secondary side and realizes a simple circuitry.

Third Embodiment

A DC converter according to a third embodiment will be explained. The DC converters of the first and second embodiments employ normally-OFF-type MOSFETs as switches. The normally-OFF-type switch is a switch that is in an OFF state when a power source is OFF. On the other hand, a normally-ON-type switch such as a SIT (static induction transistor) is a switch that is in an ON state when a power source is OFF. The normally-ON-type switch shows a high switching speed and low ON-resistance, and therefore, is an ideal element for use with a power converter such as a switching power source because it is expected to reduce a switching loss and improve efficiency.

The normally-ON-type switching element is in an ON state when a power source is turned on, and therefore, the switch will be short-circuited to become inactive. Due to this, the normally-ON-type switch has limited usage.

The DC converter according to the third embodiment employs the configuration of the DC converter of the first embodiment and employs a normally-ON-type switch as the switch Q1. When an AC power source is turned on, a voltage due to a voltage drop of a rush current limiting resistor, which is inserted to reduce a rush current of an input smoothing capacitor, is used as a reverse bias voltage for the normally-ON-type switch. This configuration solves the problem that occurs when the power source is turned on.

Figure 15:
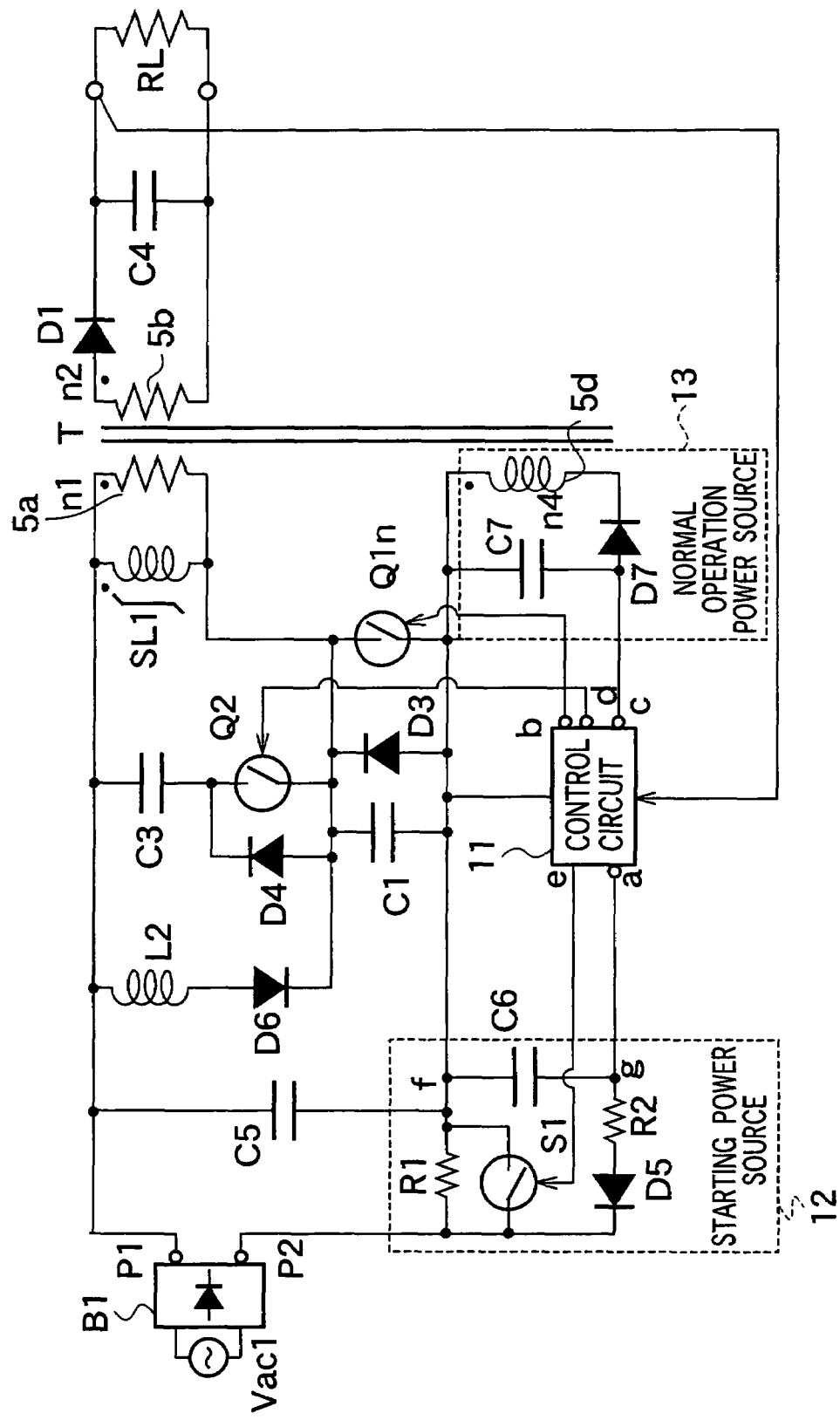
FIG. 15 is a circuit diagram showing a DC converter according to a third embodiment.

FIG. 15 is a circuit diagram showing the DC converter according to the third embodiment. The DC converter shown in FIG. 15 has the configuration of the DC converter according to the first embodiment shown in FIG. 11. In addition, the DC converter of the third embodiment rectifies an AC voltage from an AC power source Vac1 with a full-wave rectifying circuit (input rectifying circuit) B1, converts the obtained voltage into another DC voltage, and outputs the DC voltage. Between an output terminal P1 and another output terminal P2 of the full-wave rectifying circuit B1, there is connected a series circuit composed of an input smoothing capacitor C5 and a rush current limiting resistor R1. The AC power source Vac1 and full-wave rectifying circuit B1 correspond to the DC power source Vdc1 shown in FIG. 11.

The output terminal P1 of the full-wave rectifying circuit B1 is connected through a primary winding 5a of a transformer T to the normally-ON-type switch Q1n such as a SIT. The switch Q1n is turned on and off under PWM control by a control circuit 11. Switches such as Q2 other than the switch Q1n are normally-OFF-type switches.

Both ends of the rush current limiting resistor R1 are connected to a switch S1. The switch S1 is a semiconductor switch such as a normally-OFF-type MOSFET or BJT (bipolar junction transistor) and is turned on according to a short-circuit signal from the control circuit 11.

Both ends of the rush current limiting resistor R1 are also connected to a starting power source 12 composed of a capacitor C6, a resistor R2, and a diode D5. The starting power source 12 takes a voltage generated at both ends of the rush current controlling resistor R1 and uses a terminal voltage of the capacitor C6 as a reverse bias voltage to be applied through a terminal "a" of the control circuit 11 to a gate of the switch Q1n. A voltage charged in the input smoothing capacitor C5 is supplied to the control circuit 11.

When the AC power source Vac1 is turned on, the control circuit 11 starts in response to a voltage supplied from the capacitor C6 and supplies, as a control signal, a reverse bias voltage from a terminal "b" to the gate of the switch Q1n, to turn off the switch Q1n. The control signal is a pulse signal between, for example, −15 V and 0 V. The voltage of −15V turns off the switch Q1n, and the voltage of 0 V turns on the switch Q1n.

After the completion of charging the input smoothing capacitor C5, the control circuit 11 provides a control signal composed of pulse signals of 0 V and −15 V from the terminal b to the gate of the switch Q1n to make the switch Q1n conduct a switching operation. A predetermined time after making the switch Q1n perform the switching operation, the control circuit 11 outputs a short-circuit signal to the gate of the switch S1, to turn on the switch S1.

A first end of an auxiliary winding 5d (the number of turns being n4) of the transformer T is connected to a first end of the switch Q1n, a first end of a capacitor C7, and the control circuit 11. A second end of the auxiliary winding 5d is connected to a cathode of a diode D7. An anode of the diode D7 is connected to a second end of the capacitor C7 and a terminal c of the control circuit 11. The auxiliary winding 5d, diode D7, and capacitor C7 form a normal operation power source 13. The normal operation power source 13 supplies a voltage generated by the auxiliary winding 5*d* to the control circuit 11 via the diode D7 and capacitor C7.

Operation of the DC converter according to the third embodiment with the above-mentioned configuration will be explained with reference to FIGS. 15 to 17.

Figure 17:
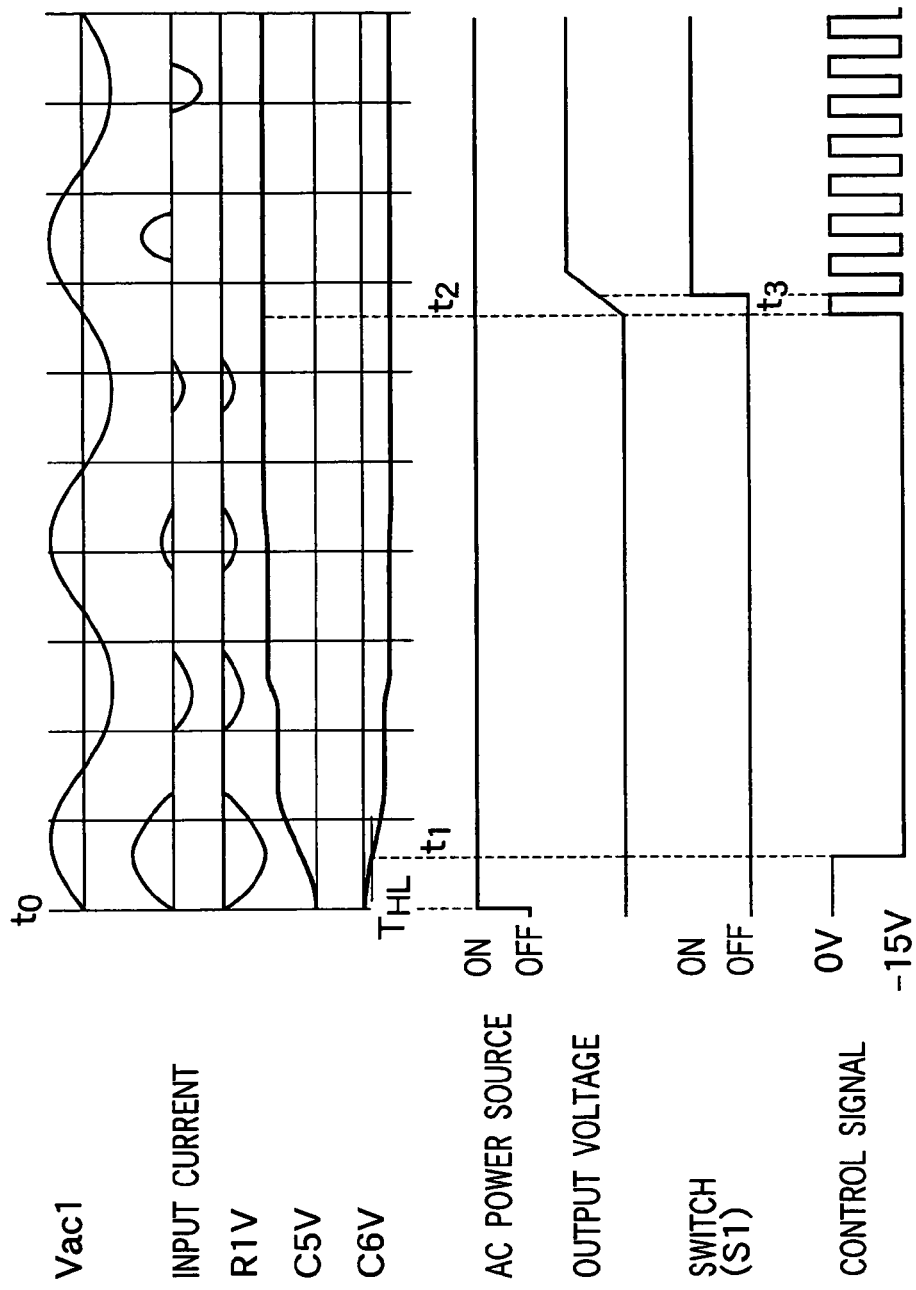
FIG. 17 is a timing chart showing signals at various parts of the DC converter according to the third embodiment.

In FIG. 17, Vac1 is an AC voltage of the AC power source Vac1, an input current is a current passed through the AC power source Vac1, R1V is a voltage generated by the rush current limiting resistor R1, C5V is a voltage of the input smoothing capacitor C5, C6V is a voltage of the capacitor C6, an output voltage is a voltage of the capacitor C4, and a control signal is a signal outputted from the terminal b of the control circuit 11 to the gate of the switch Q1*n*.

At time t0, the AC power source Vac1 is turned on. An AC voltage from the AC power source Vac1 is full-wave-rectified with the full-wave rectifying circuit B1. At this time, the normally-ON-type switch Q1*n* is in an ON state, and the switch S1 is in an OFF state. As a result, a voltage from the full-wave rectifying circuit B1 is fully applied through the input smoothing capacitor C5 to the rush current limiting resistor R1 ((1) in FIG. 16).

Figure 16:
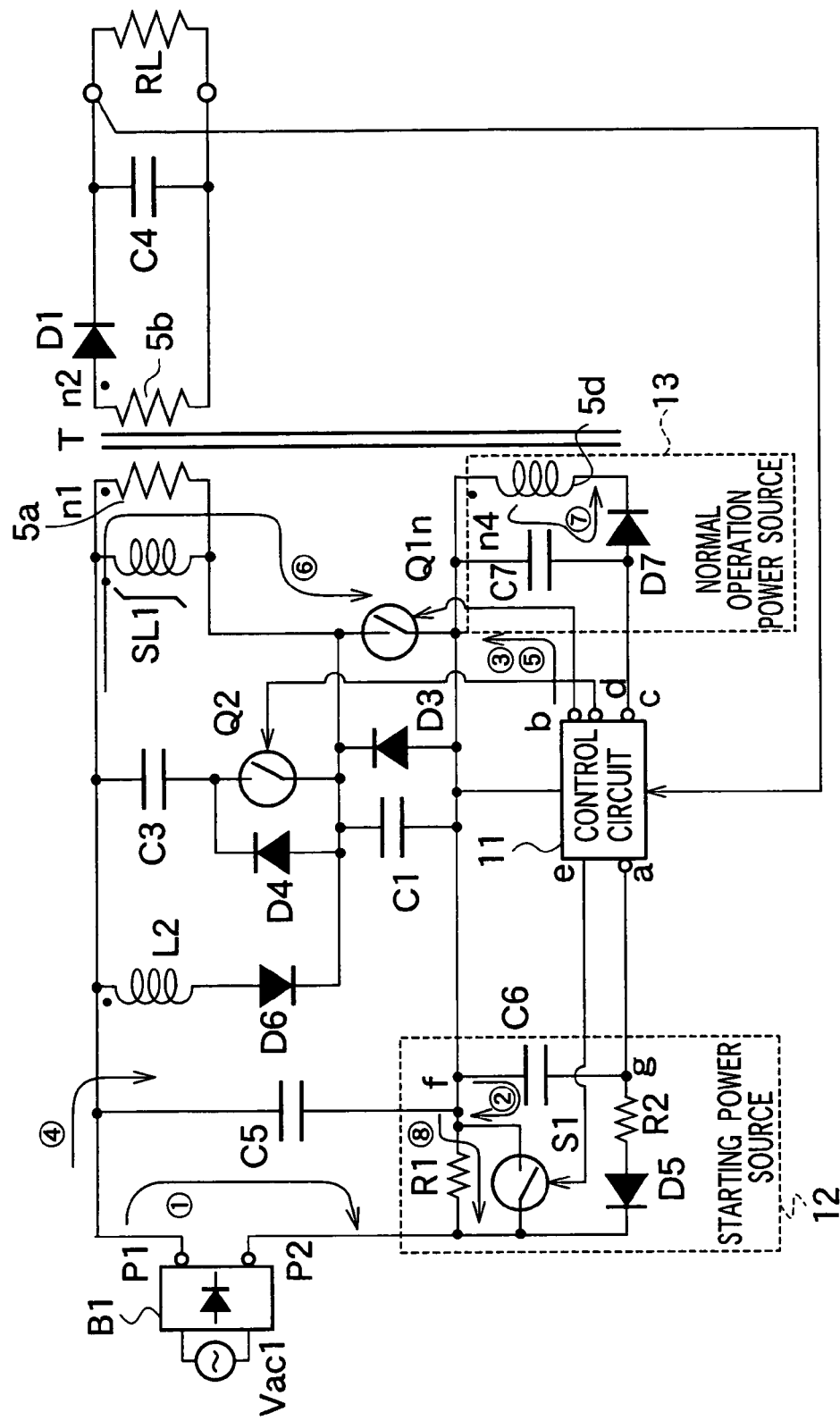
FIG. 16 is a view explaining operation of the DC converter according to the third embodiment.

The voltage generated by the rush current limiting resistor R1 is accumulated through the diode D5 and resistor R2 in the capacitor C6 ((2) in FIG. 16). At this time, the potential of a terminal f of the capacitor C6 becomes, for example, zero, and a terminal g of the capacitor C6 becomes, for example, negative potential. As a result, the capacitor C6 provides a negative voltage (reverse bias voltage) as shown in FIG. 17. The negative voltage of the capacitor C6 is supplied to the terminal a of the control circuit 11.

When the voltage of the capacitor C6 reaches a threshold voltage THL of the switch Q1*n* (at time t1 in FIG. 17), the control circuit 11 outputs a control signal of −15 V from the terminal b to the gate of the switch Q1*n* ((3) in FIG. 16). This changes the switch Q1*n* to an OFF state.

Due to the voltage from the full-wave rectifying circuit B1, the input smoothing capacitor C5 is charged ((4) in FIG. 16), and therefore, the voltage of the input smoothing capacitor C5 increases to complete the charging of the input smoothing capacitor C5.

At time t2, the control circuit 11 starts a switching operation. At first, the terminal b outputs a control signal of 0 V to the gate of the switch Q1*n* ((5) in FIG. 16). This puts the switch Q1*n* in an ON state. The output terminal P1 of the full-wave rectifying circuit B1 passes a current through the primary winding 5*a* of the transformer T to the switch Q1*n* ((6) in FIG. 16), to accumulate energy in the primary winding 5*a* of the transformer T. At this time, a secondary winding 5*b* generates a voltage to pass a current in order of 5*b*, D1, C4, and 5*b*, to supply power to a load RL.

The auxiliary winding 5*d*, which is electromagnetically coupled with the primary winding 5*a* of the transformer T, also generates a voltage that is supplied through the diode D7 and capacitor C7 to the control circuit 11 ((7) in FIG. 16). Due to this, the control circuit 11 can continuously operate to continue the switching operation of the switch Q1*n*.

At time t3, the terminal b outputs a control signal of −15 V to the gate of the switch Q1*n*, to turn off the switch Q1*n*. Also at time t3, the inductance of a saturable reactor SL1 and a resonant capacitor C1 resonate to increase the voltage of the switch Q1*n* and decrease the voltage of the switch Q2.

At time t3, the control circuit 11 outputs a short-circuit signal to the switch S1 to turn on the switch S1 and short-circuit both ends of the rush current limiting resistor R1 ((8) in FIG. 16). This reduces a loss of the rush current limiting resistor R1.

Time t3 is based on an elapsed time from the time when the AC power source Vac1 is turned on (time t0) and is, for example, about five times or more greater than a time constant (τ=C5·R1) of the input smoothing capacitor C5 and rush current controlling resistor R1. Thereafter, the switch Q1*n* repeats the ON/OFF switching operation. After the switch Q1*n* starts the switching operation, the switches Q1*n* and Q2 operate like the switches Q1 and Q2 of the DC converter according to the first embodiment shown in FIG. 11, i.e., like the operation shown in the timing charts of FIGS. 7 and 8.

In this way, the DC converter according to the third embodiment provides the effect of the first embodiment. In addition, the control circuit 11 turns off the switch Q1*n* with a voltage generated by the rush current limiting resistor R1 when the AC power source Vac1 is turned on. After the input smoothing capacitor C5 is charged, the control circuit 11 starts the ON/OFF switching operation of the switch Q1*n*. This eliminates the problem that a normally-OFF-type switch is not properly started when a power source is turned on. Namely, this embodiment can employ a normally-ON-type semiconductor switch to provide a DC converter of low loss and high efficiency.

Although the third embodiment adds a normally-ON circuit to the apparatus of the first embodiment, the normally-ON circuit may be added to the apparatus of the second embodiment.

Fourth Embodiment

Figure 18:
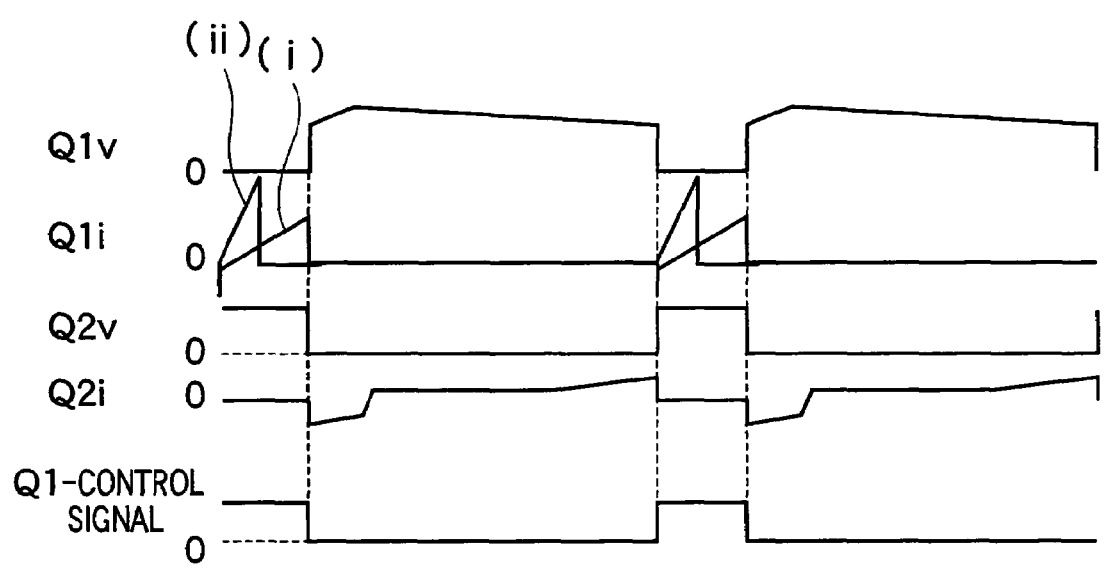
FIG. 18 is a timing chart showing signals at various parts of the DC converter according to any one of the first and second embodiments with a high input voltage.

A DC converter according to a fourth embodiment will be explained. According to the DC converters of the first and second embodiments, the current Q1*i* of the switch Q1 steeply inclines as shown in a timing chart of FIG. 18 when an input voltage is high (ii), i.e., when an input voltage widely varies. This results in increasing a peak current and drastically shortening an ON-width. To solve this problem, the inductance of the reactor L3 (for example a leakage inductor between the primary and secondary windings) on the primary side may be increased.

However, energy accumulated in the reactor L3 when the switch Q1 is ON is accumulated in the snubber capacitor C3 when the switch Q1 is OFF. When the switch Q1 is turned on next time, the accumulated energy is returned to the input. As a result, the energy accumulated in the reactor L3 increases to decrease efficiency. If the input voltage varies in a wide range, the peak current of the switch Q1 increases on the high input voltage side to increase energy returning to the input and greatly deteriorate efficiency.

The DC converter according to the fourth embodiment increases the inductance of a reactor connected in series with a primary winding of a transformer and employs an auxiliary transformer that is used to add a second return circuit to return energy accumulated in the reactor during the ON-time of the switch Q1 to the secondary side.

Figure 19:
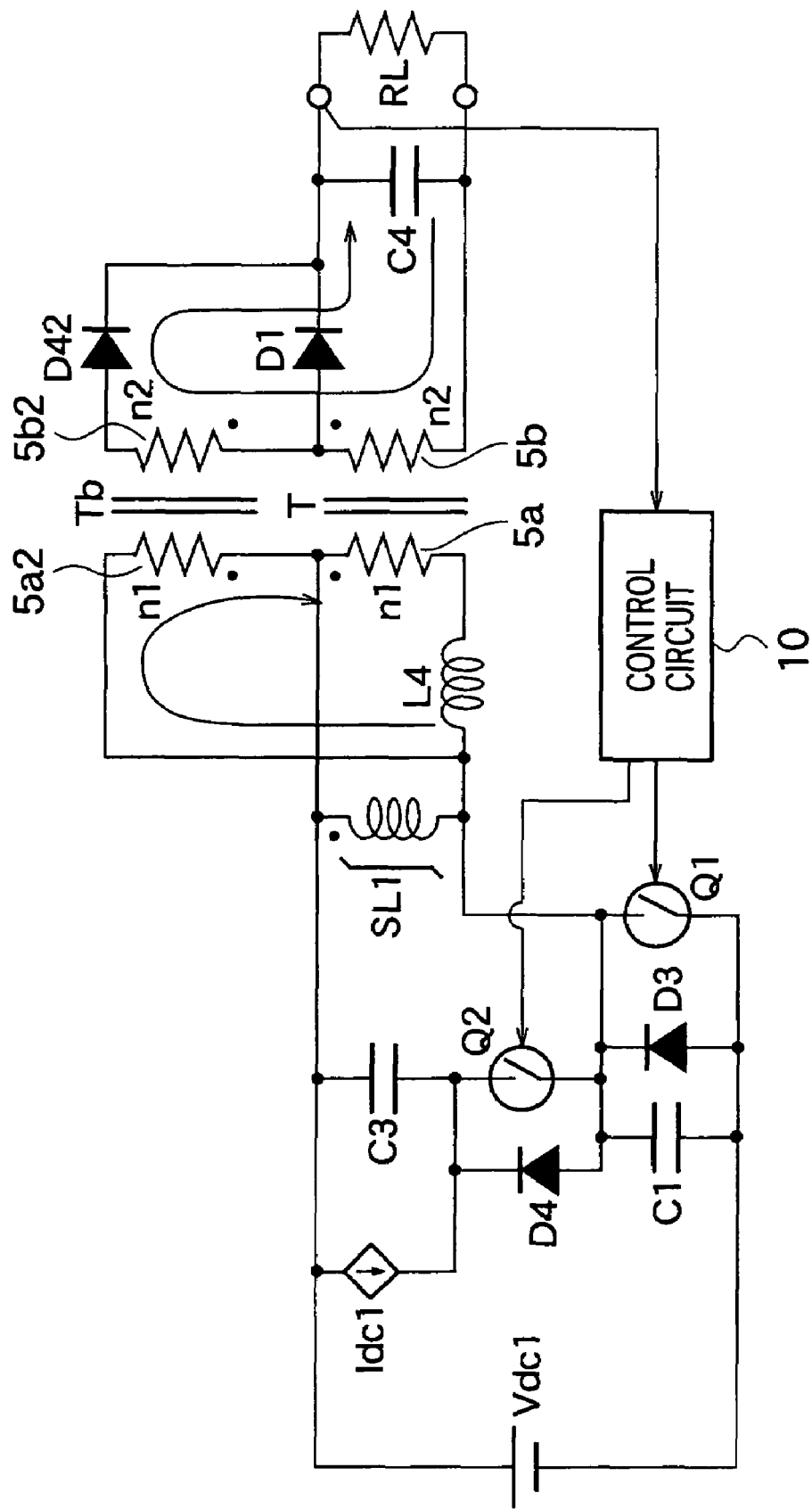
FIG. 19 is a circuit diagram showing a DC converter according to a fourth embodiment.

FIG. 19 is a circuit diagram showing the DC converter according to the fourth embodiment. The DC converter according to the fourth embodiment shown in FIG. 19 differs from the DC converter according to the first embodiment shown in FIG. 5 in the transformer T and in peripheral circuits around the transformer T. The different parts will mainly be explained.

A first end of a primary winding 5*a* of the transformer is connected to a first end of a reactor (third reactor) L4. A second end of the reactor L4 is connected to a first end of a switch Q1. A second end (marked with a dot) of the primary winding 5*a* of the transformer T is connected to a first end (marked with a dot) of a primary winding 5*a*2 (the number of turns being n1) of an auxiliary transformer Tb. A second end of the primary winding 5a2 of the auxiliary transformer Tb is connected to the second end of the reactor L4. Accordingly, a saturable reactor SL1 is connected in parallel through the reactor L4 to the primary winding 5a. The primary winding 5a and switch Q1 form a series circuit through the reactor L4, the series circuit being connected in parallel with a DC power source Vdc1.

A second end (marked with a dot) of a secondary winding 5b of the transformer T is connected to a first end (marked with a dot) of a secondary winding 5b2 (the number of turns being n2) of the auxiliary transformer Tb. A second end of the secondary winding 5b2 of the auxiliary transformer Tb is connected to an anode of a diode D42. A cathode of the diode D42 is connected to a cathode of a diode D1 and a first end of a capacitor C4. A second end of the capacitor C4 is connected to the first end of the secondary winding 5b of the transformer T. The auxiliary transformer Tb returns energy accumulated in the reactor L4 when the switch Q1 is ON to the secondary side when the switch Q1 is OFF.

Figure 20:
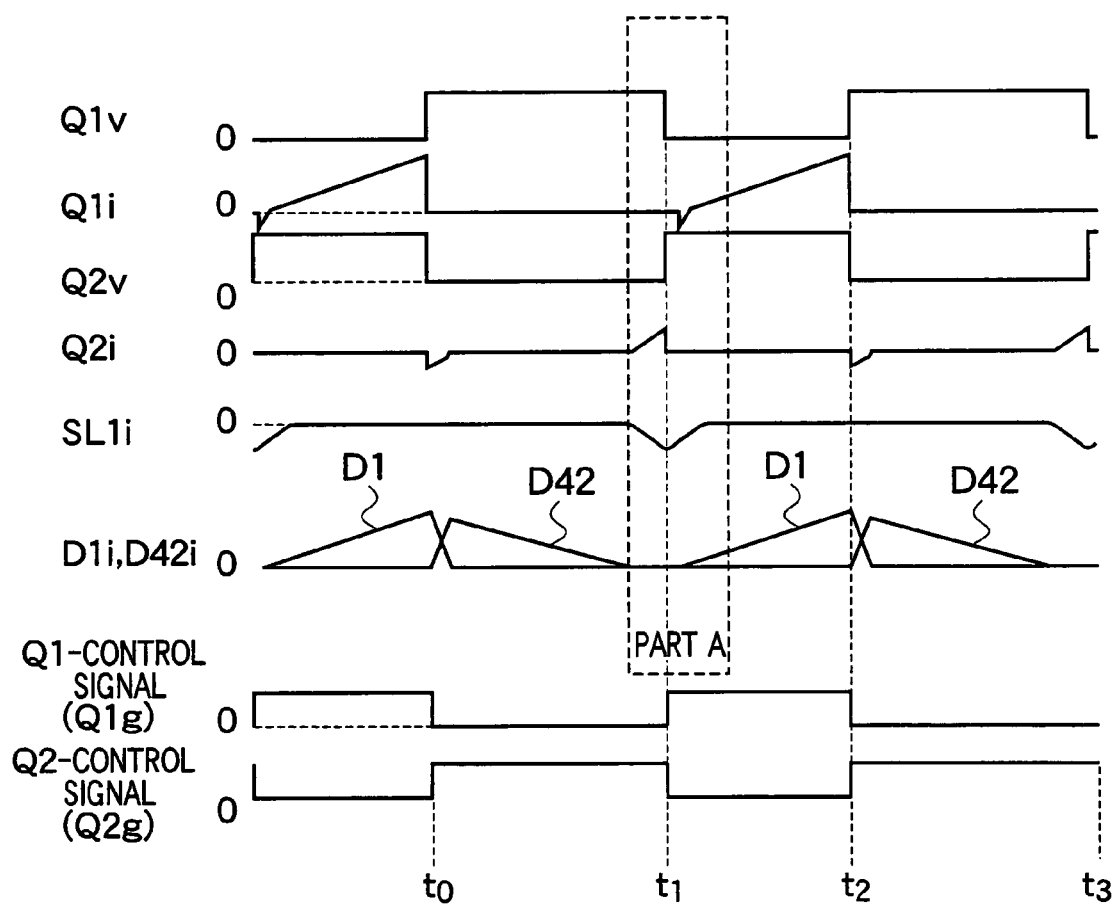
FIG. 20 is a timing chart showing signals at various parts of the DC converter according to the fourth embodiment.

Operation of the DC converter according to the fourth embodiment with the above-mentioned configuration will be explained with reference to FIG. 19 and timing charts of FIGS. 20 and 21. The timing chart of FIG. 20 shows signals at various parts of the DC converter according to the fourth embodiment. The timing chart of FIG. 21 shows signals at the various parts of the DC converter according to the fourth embodiment when the switch Q1 is turned on.

Figure 21:
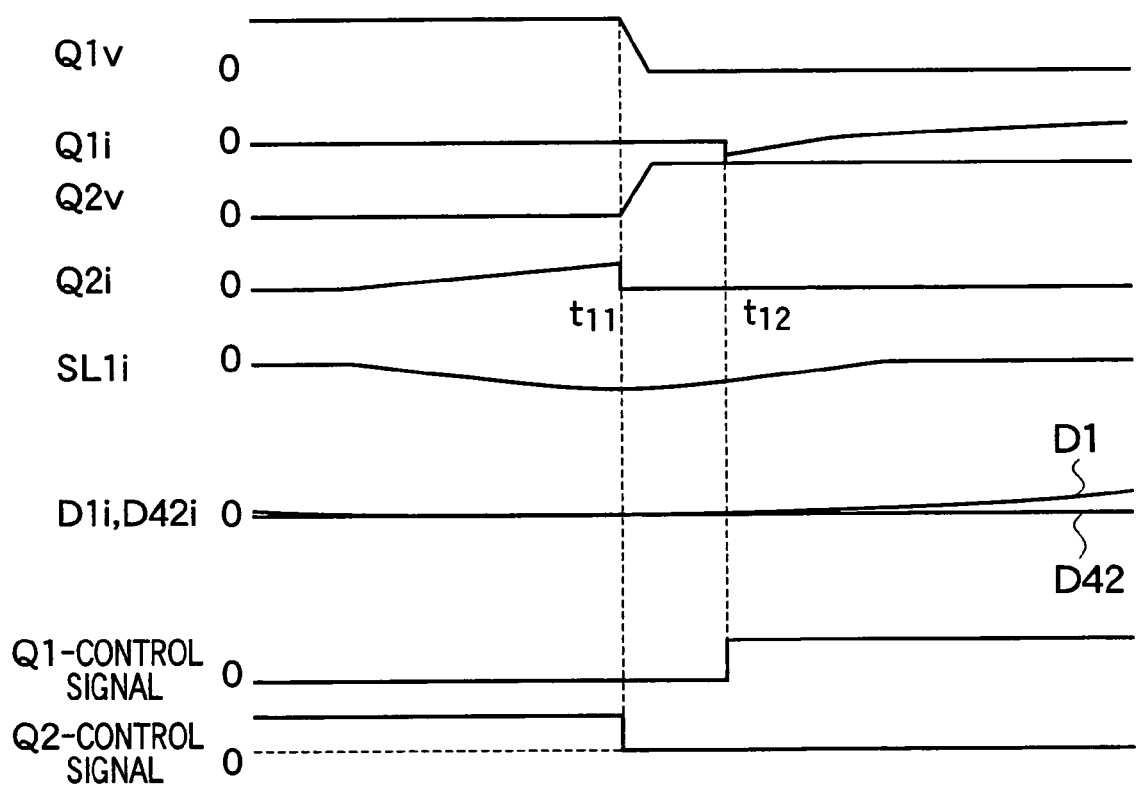

FIGS. 20 and 21 show a terminal voltage Q1v of the switch Q1, a current Q1i passing through the switch Q1, a terminal voltage Q2v of a switch Q2, a current Q2i passing through the switch Q2, and a current SL1i passing through the saturable reactor SL1.

At time t1, the switch Q1 is turned on. Like the first embodiment, a current passes in order of Vdc1, 5a, L4, Q1, and Vdc1. At the same time, the secondary winding 5b of the transformer T generates a voltage to pass a current in order of 5b, D1, C4, and 5b like the first embodiment. As shown in FIG. 20, a current of the diode D1 linearly increases.

At time t2, the switch Q1 is turned off. Like the first embodiment, energy accumulated in the saturable reactor SL1 serving as an energy keeping element and energy in a power supply source Idc1 charge a capacitor C3. In addition, energy accumulated in the reactor L4 is returned through the auxiliary transformer Tb to the secondary side. Namely, a current is passed in order of L4, 5a2, 5a, and L4 to induce a voltage on the secondary winding 5b2 of the auxiliary transformer Tb. Then, a current is passed in order of 5b2, D42, C4, 5b, and 5b2. As shown in FIG. 20, a current is passed through the diode D42 from time t2 to time t3.

When the switch Q1 is OFF, the primary winding 5a of the transformer T has a voltage V11, the primary winding 5a2 of the auxiliary transformer Tb has a voltage V21, and the reactor L4 has a voltage V12. Then, an expression (1) is established.

$$V11+V12=V21 \tag{1}$$

If the transformer T and auxiliary transformer Tb have a turn ratio a, the expression (1) is written as follows:

$$aV21=aV11=aV12 \tag{2}$$

Namely, the voltage aV12, i.e., a voltage multiplied by the turn ratio of the reactor L4 is rectified by the diode D42 and is supplied to the capacitor C4.

In this way, the reactor L4 connected in series with the primary winding 5a of the transformer T is provided with an increased inductance to return energy accumulated when the switch Q1 is ON to the secondary side through the auxiliary transformer Tb, to improve efficiency. Due to the diodes D1 and D42, a secondary current continuously flows during ON and OFF periods, to reduce a ripple current of the smoothing capacitor C4.

The saturable reactor SL1 is connected in parallel with the primary winding 5a of the transformer T, and there is provided the power supply source Idc1, to achieve a zero-voltage switching operation. The zero-voltage switching operation is the same as that of the DC converter of the first embodiment, and therefore, is not explained here.

First Modification

Figure 22:
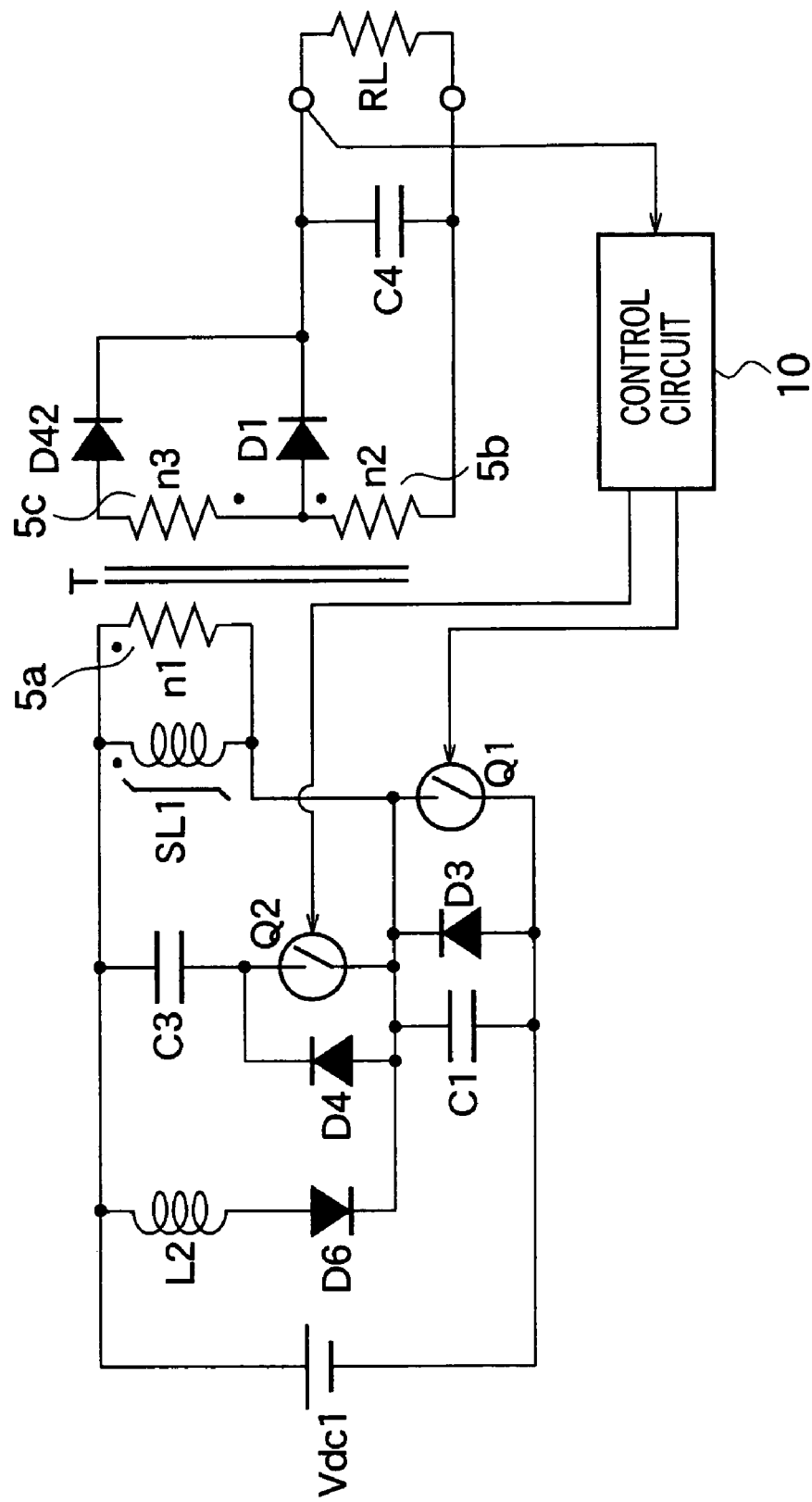
FIG. 22 is a circuit diagram showing a first modification of the DC converter according to the fourth embodiment.

FIG. 22 is a circuit diagram showing a DC converter according to a first modification of the fourth embodiment. The first modification shown in FIG. 22 provides the transformer T with a primary winding 5a (the number of turns being n1), a secondary winding 5b (the number of turns being n2), and a tertiary winding 5c (having the number of turns of n3 and corresponding to the secondary winding 5b2 of the auxiliary transformer Tb). The primary winding 5a and secondary winding 5b are in-phase, and the primary winding 5a and tertiary winding 5c have opposite phases.

According to this embodiment, the secondary winding 5b of the transformer T is loosely coupled with the primary winding 5a, and a leakage inductance between the primary winding 5a and the secondary winding 5b serves as a reactor L4 connected in series with the transformer T. Namely, the leakage inductance between the primary winding 5a and the secondary winding 5b serves as the reactor L4 of FIG. 19, to return energy to the secondary side. This means that the auxiliary transformer Tb shown in FIG. 19 can be coupled with the transformer T shown in FIG. 22. An example of coupling the auxiliary transformer Tb with the transformer T will be explained later with reference to FIG. 25.

The power supply source Idc1 is formed from a series circuit (second series circuit) composed of a reactor L2 and a diode D6. The operation and effect of the power supply source Idc1 are the same as those of the DC converter according to the first embodiment shown in FIG. 11, and therefore, will not be explained again.

Second Modification

Figure 23:
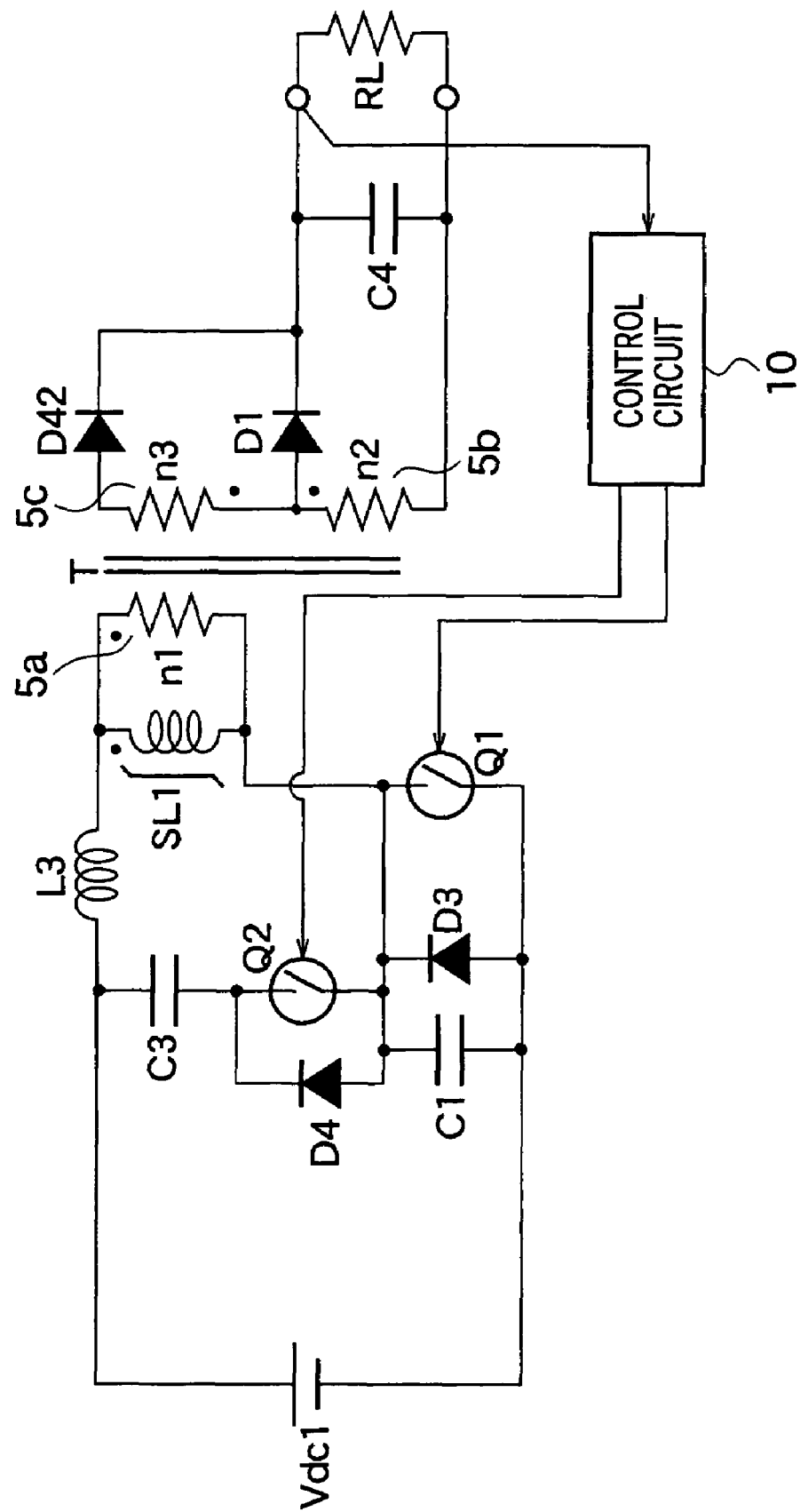
FIG. 23 is a circuit diagram showing a second modification of the DC converter according to the fourth embodiment.

FIG. 23 is a circuit diagram showing a second modification of the DC converter according to the fourth embodiment. The second modification shown in FIG. 23 differs from the embodiment of FIG. 22 only in the structure of a power supply source Idc1. Namely, the power supply source Idc1 of the second modification is formed from a reactor L3 connected in series with the primary winding 5a of the transformer T. The operation and effect of the power supply source Idc1 are the same as those of the first modification of the DC converter according to the first embodiment, and therefore, are not explained here.

The reactor L2 and diode D6 of the power supply source Idc1 shown in FIG. 22 may be combined with the reactor L3 serving as the power supply source Idc1 shown in FIG. 23. This can cope with light load as well as heavy load.

The reactor L3 may be replaced with a leakage inductor of the transformer T. The saturable reactor SL1 may be replaced with an excitation inductance of a transformer T shown in FIG. 25 employing a core of good saturation characteristic.

This circuit can control an output voltage with a fixed switching frequency and PWM control, to easily cope with a broadcasting interference.

Fifth Embodiment

Figure 24:
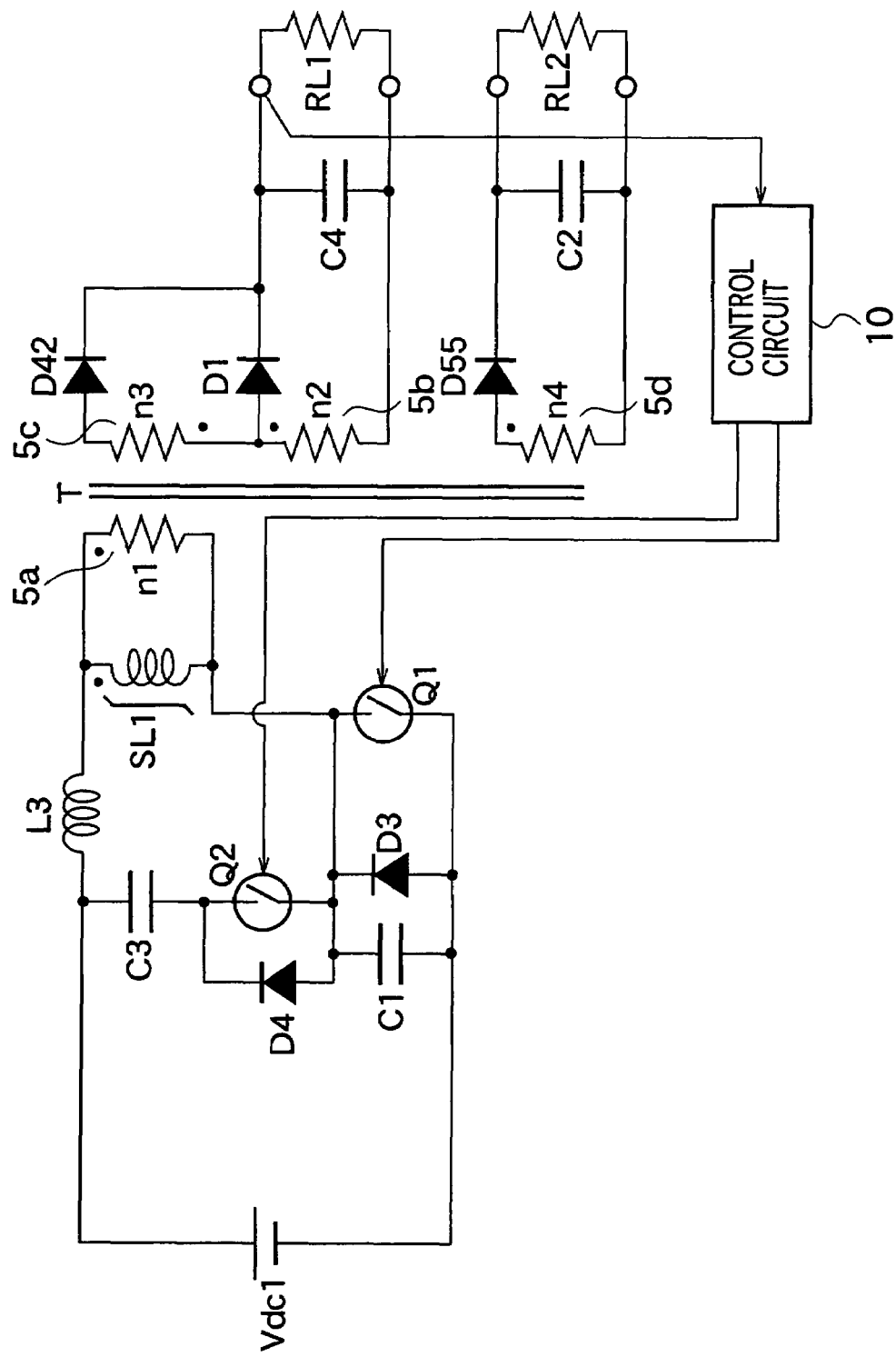
FIG. 24 is a circuit diagram showing a DC converter according to a fifth embodiment.

A DC converter according to a fifth embodiment will be explained. FIG. 24 is a circuit diagram showing the DC converter according to the fifth embodiment. The DC converter according to the fifth embodiment employs a transformer having a secondary winding 5b and a quaternary winding 5d on the secondary side to provide two outputs. The secondary side of the transformer T may have three or more windings to provide three or more outputs. Here, only two outputs will be explained.

The DC converter according to this embodiment includes, in addition to the components of the DC converter shown in FIG. 23, the quaternary winding 5d wound around a core of the transformer T, a diode D55, a capacitor C2, and a load RL2. The quaternary winding 5d is in-phase with respect to the secondary winding 5b. A first end of the quaternary winding 5d is connected to an anode of the diode D55. A cathode of the diode D55 and a second end of the quaternary winding 5d are connected to the capacitor C2. The diode D55 and capacitor C2 form a rectifying/smoothing circuit. The capacitor C2 smoothes a rectified voltage of the diode D55 and provides a DC output to the load RL2.

A primary winding 5a and the quaternary winding 5d are loosely coupled. For example, these windings are spaced apart from each other to realize the coarse coupling. The secondary winding 5b and quaternary winding 5d are tightly coupled. For example, these windings are brought closer to each other to realize the dense coupling.

A control circuit 10 turns on and off switches Q1 and Q2 alternately. When an output voltage of a load RL1 becomes equal to or greater than a reference voltage, the ON-width of a pulse applied to the switch Q1 is narrowed and the ON-width of a pulse applied to the switch Q2 is widened. Namely, when an output voltage of the load RL1 becomes equal to or greater than the reference voltage, the ON-width of a pulse applied to the switch Q1 is narrowed to control each output voltage to a constant value.

In this way, according to the DC converter of the fifth embodiment, a voltage from the secondary winding 5b is rectified and smoothed with a diode D1 and a capacitor C4 and DC power is supplied to the load RL1. Also, a voltage from the quaternary winding 5d is rectified and smoothed with the diode D55 and capacitor C2 and DC power is supplied to the load RL2.

The primary winding 5a and secondary winding 5b are loosely coupled to increase a leakage inductance on the primary side. The secondary winding 5b and quaternary winding 5d are tightly coupled, to reduce a leakage inductance on the secondary side. As a result, outputs of the secondary side (output of the secondary winding and output of the quaternary winding) show little variation under light load as well as under heavy load, to achieve a good load variation characteristic. This improves a cross regulation on the secondary side. A cross regulation among the plurality of outputs is satisfactory, and therefore, an auxiliary regulator can be omitted to simplify a circuitry.

Figure 25:
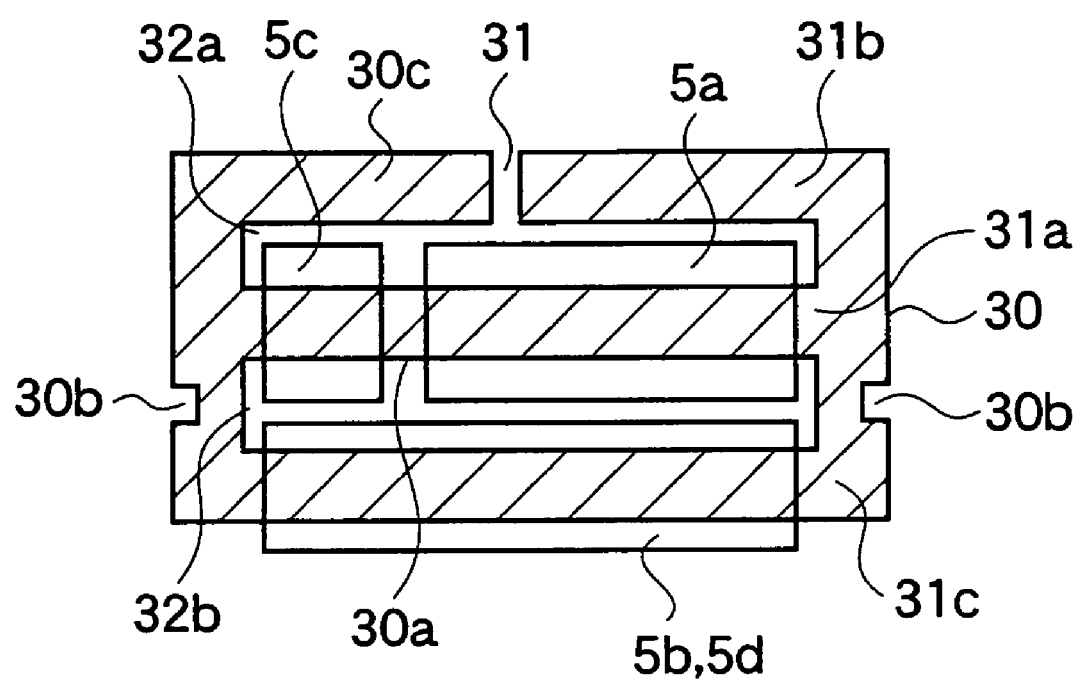
FIG. 25 is a structural view showing a transformer arranged in the DC converter according to the third and fifth embodiments.

FIG. 25 is a structural view showing a transformer for the DC converter according to any one of the fourth and fifth embodiments. The transformer shown in FIG. 25 has a core 30 with substantially a rectangular external shape. The core 30 has magnetic paths 31a, 31b, and 31c formed by elongate gaps 32a and 32b extended along the length of the magnetic paths. The core 30 has a core part 30a around which a primary winding 5a and a tertiary winding 5c are wound close to each other. This forms a slight leakage inductance between the primary winding and the tertiary winding, so that the leakage inductance is used as the reactor L3. The core 30 defining the magnetic path 31b forms a path core 30c and a gap 31. An outer circumferential core defining the magnetic path 31c is wound with a secondary winding 5b. A quaternary winding 5d is wound close to the secondary winding 5b. Namely, the path core 30c functions to loosely couple the primary winding 5a and secondary winding 5b (also the quaternary winding 5d), to increase a leakage inductance. This large leakage inductance is used as the reactor L4.

Two recesses 30b are formed on the outer circumferential core between the primary winding 5a and the secondary winding 5b. The recesses 30b partly reduce the cross-sectional area of the outer circumferential core, so that only the narrowed parts may saturate to reduce a core loss. This saturation primary winding 5a may be used as the saturable reactor SL1.

In this way, the shape of the core of the transformer T and the windings thereof may be configured to combine, on the single core 30, the transformer T with the auxiliary transformer Tb for returning energy of the reactor L4 to the secondary side. In addition, the path core 30c is formed. This results in providing a large leakage inductance. Since the transformer and reactor are combined together, the DC converter is small and is manufacturable at low cost.

Sixth Embodiment

Figure 26:
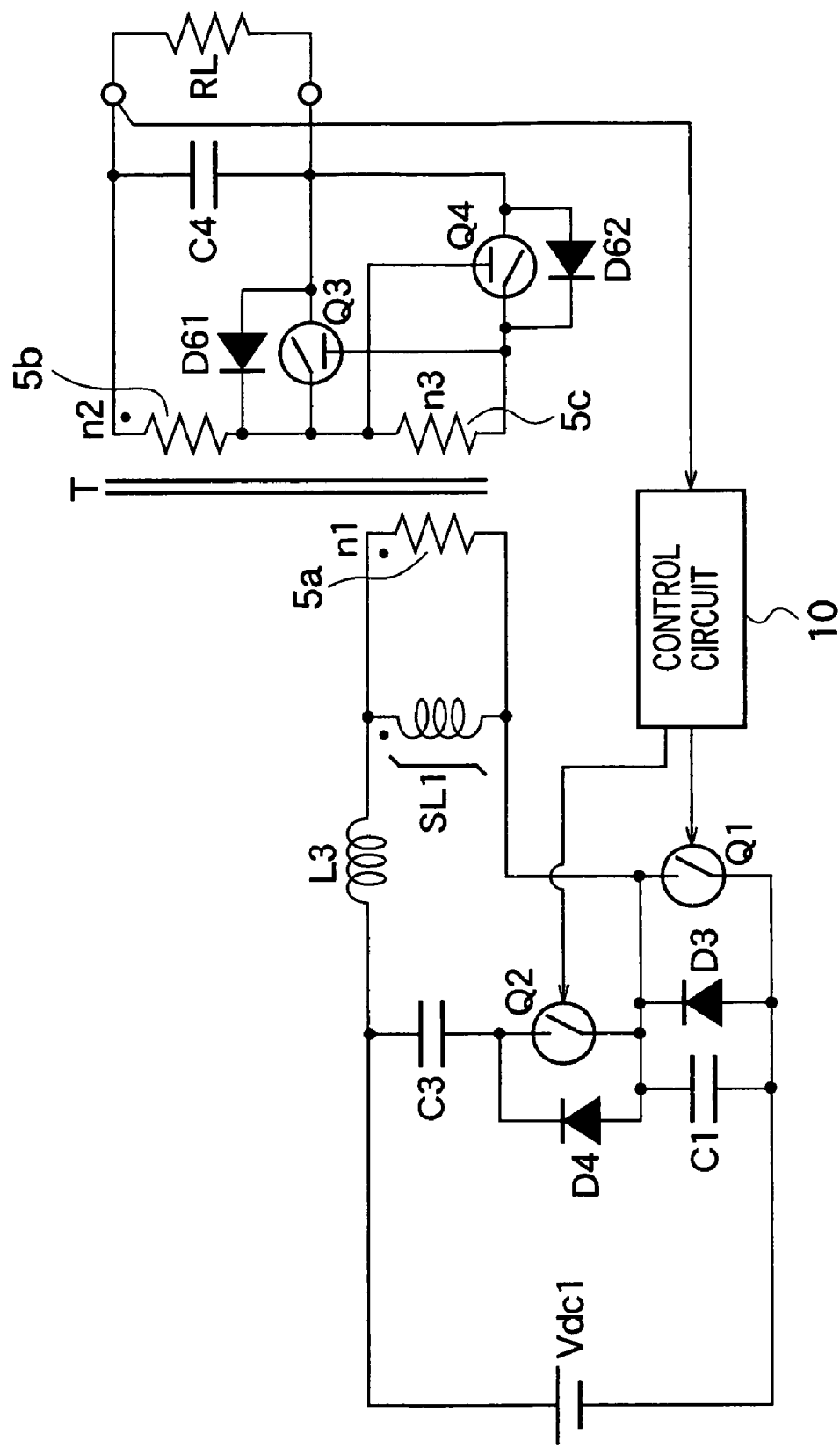
FIG. 26 is a circuit diagram showing a DC converter according to a sixth embodiment.

A DC converter according to a sixth embodiment will be explained. FIG. 26 is a circuit diagram showing the DC converter according to the sixth embodiment. The DC converter according to the sixth embodiment employs a synchronous rectifier in a secondary circuitry of a transformer. The transformer outputs a rectangular waveform, and the embodiment increases a conduction ratio for synchronous rectification, to reduce a rectifier loss for a low output voltage and improve rectification efficiency.

The DC converter according to the embodiment shown in FIG. 26 is the same as the DC converter according to the second modification of the fourth embodiment shown in FIG. 23 except the structure of the secondary circuitry of the transformer T. Accordingly, the same parts are represented with the same reference marks, and only the structure of the secondary circuitry of the transformer T will be explained. A primary winding 5a and a secondary winding 5b are loosely coupled, and the secondary winding 5b and a tertiary winding 5c are tightly coupled.

A first end (marked with a dot) of the secondary winding 5b of the transformer T is connected to a first end of a capacitor C4, and a second end of the secondary winding 5b of the transformer T is connected through a switch (third switch) Q3 made of a FET to a second end of the capacitor C4. A first end (marked with a dot) of the tertiary winding 5c of the transformer T is connected through a switch (fourth switch) Q4 made of a FET to the second end of the capacitor C4. A second end of the tertiary winding 5c of the transformer T is connected to the second end of the secondary winding 5b of the transformer T.

The first end of the tertiary winding 5c of the transformer T is connected to a gate of the switch Q3, and the second end of the tertiary winding 5c of the transformer T is connected to a gate of the switch Q4. The switch Q3 is connected in parallel with a diode D61, and the switch Q4 is connected in parallel with a diode D62. These elements form the synchronous rectifying circuit. The capacitor C4 forms a smoothing circuit. The rectifying/smoothing circuit rectifies and smoothes a voltage (ON/OFF-controlled pulse voltage) induced on the secondary winding 5b and tertiary winding 5c of the transformer T and outputs DC output to a load RL.

Figure 27:
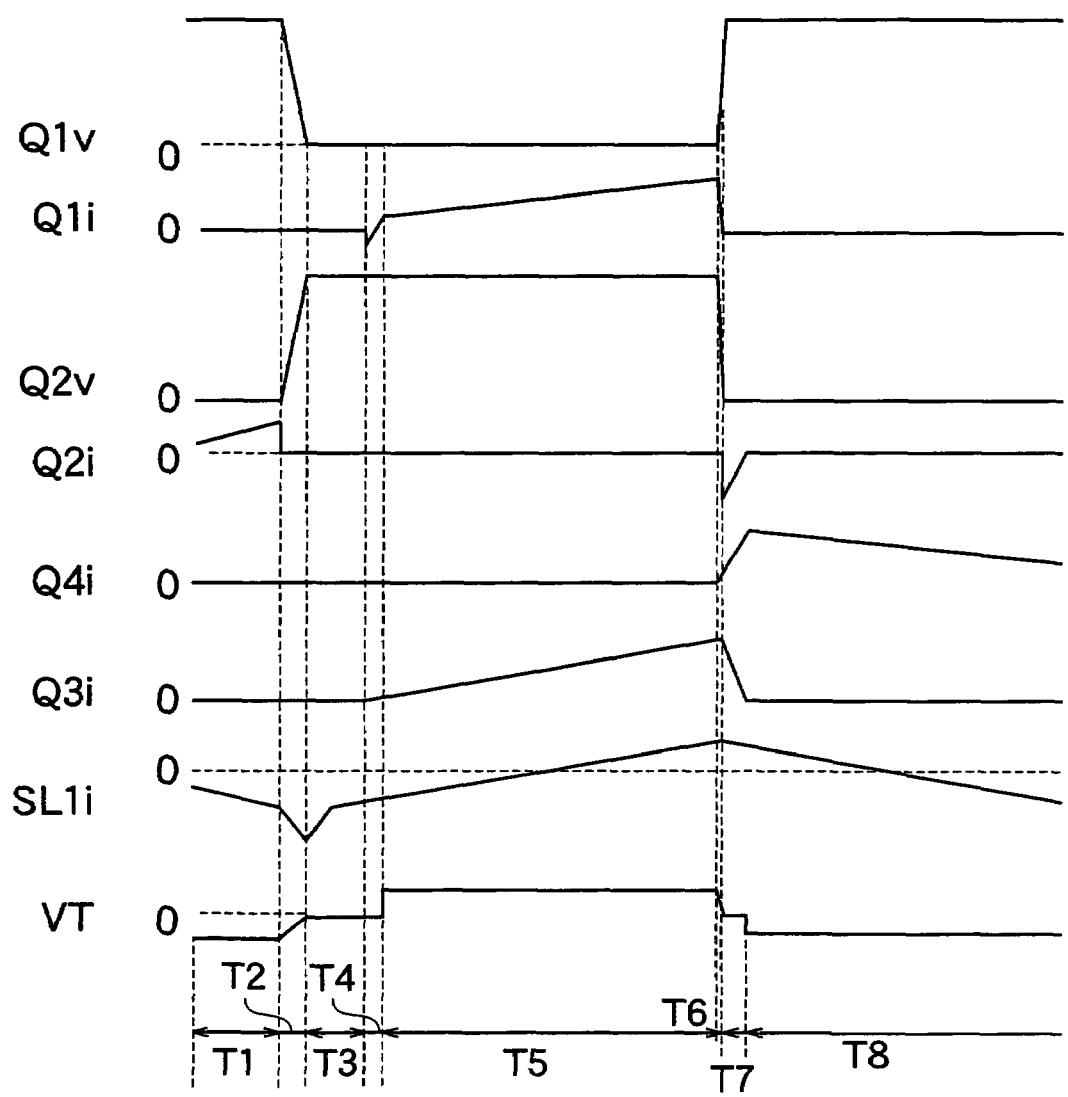
FIG. 27 is a timing chart showing signals at various parts of the DC converter according to the sixth embodiment.

Operation of the DC converter according to the sixth embodiment with the above-mentioned configuration will be explained with reference to a timing chart shown in FIG. 27. In FIG. 27, Q1v is a terminal (drain-source) voltage of a switch Q1, Q1i is a current (drain current) passing through the switch Q1, Q2v is a terminal voltage of a switch Q2, Q2i is a current passing through the switch Q2, Q3i is a current passing through the switch Q3, Q4i is a current passing through the switch Q4, SL1i is a current passing through a saturable reactor SL1, and VT is a terminal voltage of the secondary winding 5b of the transformer T.

In period T1 (or period T8, corresponding to time t0 to t1 in FIG. 20 and time t2 to time t3 in FIG. 20), the switch Q1 is OFF and the switch Q2 is ON. As a result, the switch Q2 passes a current and the switch Q1 passes no current. At this time, energy accumulated in a leakage inductor between the primary and secondary windings of the transformer T generates voltage on the tertiary winding 5c (negative on the side marked with a dot of the tertiary winding 5c and positive on the other side). As a result, the positive voltage is applied to the gate of the switch Q4 to turn on the switch Q4, and the negative voltage is applied to the gate of the switch Q3 to turn off the switch Q3. A current is passed in order of 5c, 5b, C4, Q4, and 5c, and an output voltage is generated on the load RL.

In a period from T2 to T4 (corresponding to time t1 in FIG. 20), the switch Q2 is changed from the ON state to an OFF state, and the switch Q1 is changed from the OFF state to an ON state. Accordingly, the saturation inductance of the saturable reactor SL1, the inductance of a reactor L3, and a capacitor C1 resonate. The resonance decreases the voltage of the switch Q1 and increases the voltage of the switch Q2 (period T2). When the switch Q1 decreases close to a zero voltage (period T3), the switch Q1 is turned on, and therefore, a current is passed through the switch Q1 (period T4).

In period T5 (corresponding to time t1 to time t2 of FIG. 20), the switch Q1 is ON and the switch Q2 is OFF. At this time, a DC power source Vdc1 supplies a current through the primary winding 5a of the transformer T to the switch Q1 to accumulate energy in the primary winding 5a (positive on the side marked with a dot of the primary winding 5a and negative on the other side). This energy generates voltage on the secondary winding 5b and tertiary winding 5c (positive on each side marked with a dot of the secondary winding 5b and tertiary winding 5c and negative on the other sides). Accordingly, the positive voltage is applied to the gate of the switch Q3 to turn on the switch Q3, and the negative voltage is applied to the gate of the switch Q4 to turn off the switch Q4. Then, a current passes in order of 5b, C4, Q3, and 5b to supply DC power to the load RL. When the switch Q1 is turned on, the saturable reactor SL1 passes the current SL1i to accumulate energy in the inductor of the saturable reactor SL1.

In period T6 (corresponding to time t2 of FIG. 20), the switch Q1 is changed from the ON state to an OFF state. In period T6, the inductance of the saturable reactor SL1, the inductance of the reactor L3, and the resonant capacitor C1 resonate. The resonance steeply increases the voltage of the switch Q1.

In period T7 (corresponding to time t2 of FIG. 20), a diode D4 turns on after the switch Q1 is turned off, and the diode D4 passes a current. As a result, the energy in the saturable reactor SL1 and the energy in the reactor L3 are accumulated through the diode D4 in the snubber capacitor C3. During the ON period of the diode D4, the switch Q2 is turned on so that the switch Q2 functions as a zero-voltage switch.

In this way, the DC converter according to the sixth embodiment provides the effect of the fourth embodiment. In addition, the sixth embodiment employs the synchronous rectifier in the secondary circuitry of the transformer T. The transformer outputs a rectangular waveform, which is applied to the gate of the synchronous rectifying element to make it conductive substantially during the whole period. Then, no current passes through the parallel-connected diode, and therefore, the rectification is carried out without loss. This is effective for a low output voltage such as 5 V or 3.3 V.

Seventh Embodiment

A DC converter according to a seventh embodiment will be explained. The DC converter according to the seventh embodiment has the structure of the DC converter according to the fourth embodiment, and like the third embodiment, employs a normally-ON-type switch as a switch Q1. When an AC power source is turned on, a voltage due to a voltage drop of a rush current limiting resistor, which is inserted to reduce a rush current of an input smoothing capacitor, is used as a reverse bias voltage for the normally-ON-type switch, thereby solving the problem that occurs when the power source is turned on.

Figure 28:
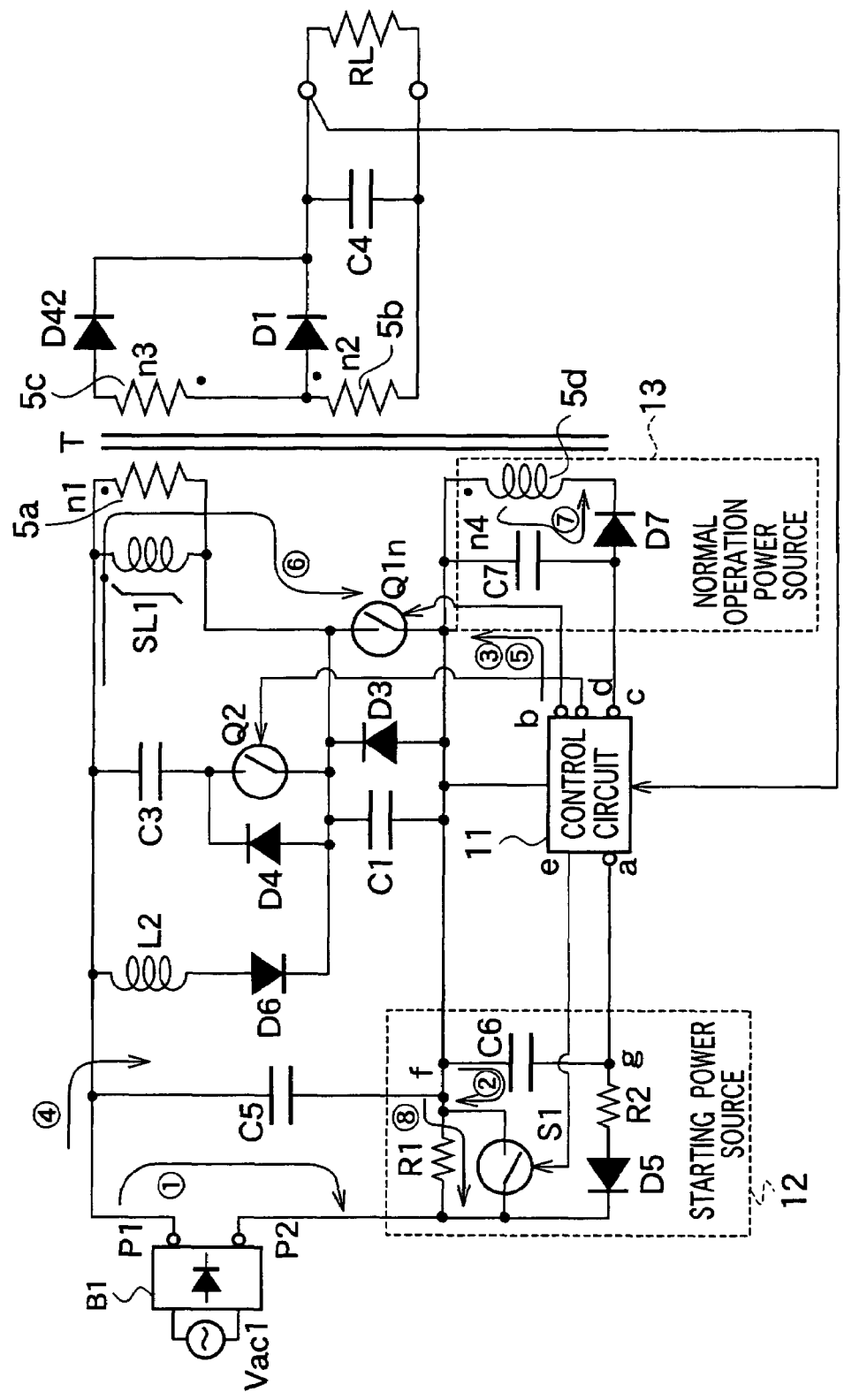
FIG. 28 is a circuit diagram showing a DC converter according to a seventh embodiment.

FIG. 28 is a circuit diagram showing the DC converter according to the seventh embodiment. The DC converter shown in FIG. 28 has the structure of the first modification of the DC converter according to the fourth embodiment shown in FIG. 22. Like the third embodiment shown in FIG. 15, an AC power source Vac1 supplies an AC voltage, which is rectified with a full-wave rectifying circuit (input rectifying circuit) B1 and is converted into a DC output voltage. Between output ends P1 and P2 of the full-wave rectifying circuit B1, there is connected a series circuit composed of an input smoothing capacitor C5 and a rush current limiting resistor R1. The AC power source Vac1 and full-wave rectifying circuit B1 correspond to the DC power source Vdc1 shown in FIG. 22.

The output end P1 of the full-wave rectifying circuit B1 is connected through a primary winding 5a of a transformer T to a normally-ON-type switch Q1n such as a SIT. The switch Q1n is turned on and off under PWM control by a control circuit 11. Switches such as Q2 other than the switch Q1n are normally-OFF-type switches.

Both ends of the rush current limiting resistor R1 are connected to a switch S1. The switch S1 is a semiconductor switch such as a normally-OFF-type MOSFET or BJT (bipolar junction transistor) and is turned on in response to a short-circuit signal from the control circuit 11.

Both ends of the rush current limiting resistor R1 is also connected to a starting power source 12 consisting of a capacitor C6, a resistor R2, and a diode D5. The starting power source 12 picks up a terminal voltage of the rush current limiting resistor R1 and uses a terminal voltage of the capacitor C6 as a reverse bias voltage to be applied through a terminal "a" of the control circuit 11 to a gate of the switch Q1n. A voltage charged in the input smoothing capacitor C5 is supplied to the control circuit 11.

When the AC power source Vac1 is turned on, the control circuit 11 is activated according to a voltage supplied from the capacitor C6 and supplies, as a control signal, a reverse bias voltage from a terminal "b" to the gate of the switch Q1n to turn off the switch Q1n. The control signal is a pulse signal of, for example, −15 V or 0 V in which the voltage of −15 V turns off the switch Q1n and the voltage of 0 V turns on the switch Q1n.

After the completion of charging the input smoothing capacitor C5, the control circuit 11 provides a control signal composed of pulse signals of 0 V and −15 V from the terminal b to the gate of the switch Q1n to make the switch Q1n perform a switching operation. A predetermined time after making the switch Q1n perform the switching operation, the control circuit 11 provides a short-circuit signal to the gate of the switch S1 to turn on the switch S1.

A first end of an auxiliary winding 5d (the number of turns being n4) of the transformer T is connected to a first end of the switch Q1n, a first end of a capacitor C7, and the control circuit 11. A second end of the auxiliary winding 5d is connected to a cathode of a diode D7. An anode of the diode D7 is connected to a second end of the capacitor C7 and a terminal c of the control circuit 11. The auxiliary winding 5d, diode D7, and capacitor C7 form a normal operation power source 13. The normal operation power source 13 supplies a voltage generated by the auxiliary winding 5d to the control circuit 11 through the diode D7 and capacitor C7.

Operation of the DC converter according to the seventh embodiment with the above-mentioned configuration will be explained with reference to FIGS. 28 and 29.

Figure 29:
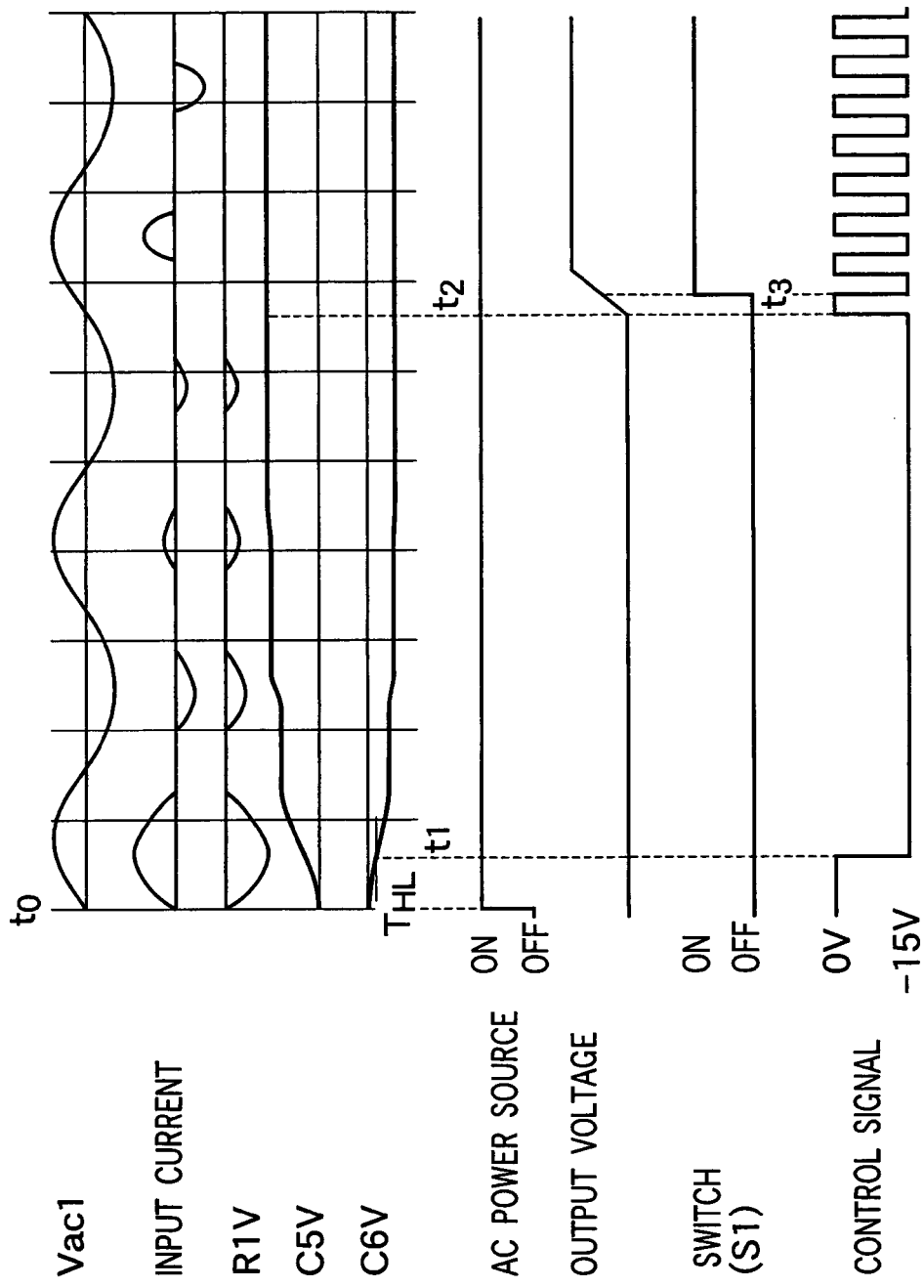
FIG. 29 is a timing chart showing signals at various parts of the DC converter according to the seventh embodiment.

In FIG. 29, Vac1 is an AC voltage of the AC power source Vac1, an input current is a current passed through the AC power source Vac1, R1V is a voltage generated by the rush current limiting resistor R1, C5V is a voltage of the input smoothing capacitor C5, C6V is a voltage of the capacitor C6, an output voltage is a voltage of a capacitor C4, and a control signal is a signal supplied from the terminal b of the control circuit 11 to the gate of the switch Q1n.

At time t0, the AC power source Vac1 is turned on. The AC voltage of the AC power source Vac1 is full-wave-rectified with the full-wave rectifying circuit B1. At this time, the normally-ON-type switch Q1n is in an ON state, and the switch S1 is in an OFF state. As a result, the voltage from the full-wave rectifying circuit B1 is fully applied through the input smoothing capacitor C5 to the rush current limiting resistor R1 ((1) in FIG. 28).

The voltage generated by the rush current limiting resistor R1 is accumulated through the diode D5 and resistor R2 in the capacitor C6 ((2) in FIG. 28). At this time, the potential of a terminal f of the capacitor C6 becomes, for example, zero, and a terminal g of the capacitor C6 becomes, for example, negative potential. As a result, the voltage of the capacitor C6 becomes negative (reverse bias voltage) as shown in FIG. 29. The negative voltage of the capacitor C6 is supplied to the terminal a of the control circuit 11.

When the voltage of the capacitor C6 reaches a threshold voltage THL of the switch Q1n (time t1 in FIG. 29), the control circuit 11 outputs a control signal of −15 V from the terminal b to the gate of the switch Q1n ((3) in FIG. 28). As a result, the switch Q1n shifts to an OFF state.

Due to the voltage from the full-wave rectifying circuit B1, the input smoothing capacitor C5 is charged ((4) in FIG. 28), and therefore, the voltage of the input smoothing capacitor C5 increases to complete the charging of the input smoothing capacitor C5.

At time t2, the control circuit 11 starts a switching operation. At first, the terminal b outputs a control signal of 0 V to the gate of the switch Q1n ((5) in FIG. 28). This puts the switch Q1n in an ON state. The output terminal P1 of the full-wave rectifying circuit B1 passes a current through the primary winding 5a of the transformer T to the switch Q1n ((6) in FIG. 28), to accumulate energy in the primary winding 5a of the transformer T. At this time, a secondary winding 5b generates a voltage to pass a current in order of 5b, D1, C4, and 5b. As a result, power is supplied to a load RL.

The auxiliary winding 5d, which is electromagnetically coupled with the primary winding 5a of the transformer T, also generates a voltage that is supplied through the diode D7 and capacitor C7 to the control circuit 11 ((7) in FIG. 28). Due to this, the control circuit 11 can continuously operate to continue the switching operation of the switch Q1n.

At time t3, the terminal b outputs a control signal of −15 V to the gate of the switch Q1n. As a result, the switch Q1n turns off at time t3, and energy accumulated in a leakage inductor between the primary and secondary windings passes a current through 5c, D42, C4, 5b, and 5c in this order. Also at time t3, the inductance of a saturable reactor SL1 and a resonant capacitor C1 resonate to increase the voltage of the switch Q1n and decrease the voltage of the switch Q2.

At time t3, the control circuit 11 outputs a short-circuit signal to the switch S1 to turn on the switch S1 and short-circuit the ends of the rush current limiting resistor R1 ((8) in FIG. 28). This reduces a loss by the rush current limiting resistor R1.

Time t3 is based on an elapsed time from the time when the AC power source Vac1 is turned on (time t0) and is, for example, about five times or more greater than a time constant ($\tau = C5 \cdot R1$) of the input smoothing capacitor C5 and rush current controlling resistor R1. Thereafter, the switch Q1n repeats the ON/OFF switching operation. After the switch Q1n starts the switching operation, the switches Q1n and Q2 operate like the switches Q1 and Q2 of the DC converter according to the fourth embodiment shown in FIG. 22, i.e., like the operation shown in the timing charts of FIGS. 20 and 21.

In this way, the DC converter according to the seventh embodiment provides the effect of the fourth embodiment. In addition, like the third embodiment, the control circuit 11 turns off the switch Q1n with a voltage generated by the rush current limiting resistor R1 when the AC power source Vac1 is turned on. After the input smoothing capacitor C5 is charged, the control circuit 11 starts the ON/OFF switching operation of the switch Q1n. This solves the problem that occurs when the power source is turned on. Namely, this embodiment can employ a normally-ON-type semiconductor switch to provide a DC converter of low loss and high efficiency.

Although the seventh embodiment adds a normally-ON circuit to the apparatus of the fourth embodiment, the normally-ON circuit may be added to the apparatus of the fifth embodiment or to the apparatus of the sixth embodiment.

As explained above, this embodiment can achieve zero-voltage switching, relax the rise and fall of voltage with a resonant action, and realize a DC converter of low noise and high efficiency.

Also, this embodiment improves the flux use of a core of a transformer, reduces a ripple current of a smoothing capacitor in a secondary circuitry of the transformer, and reduces the size of a DC converter. The embodiment realizes a proper cross regulation among multiple outputs. The embodiment provides a rectangular output voltage from the secondary side of a transformer, and therefore, is advantageous in synchronous rectification and can realize high efficiency with respect to a low output voltage.

Eighth Embodiment

Figure 30:
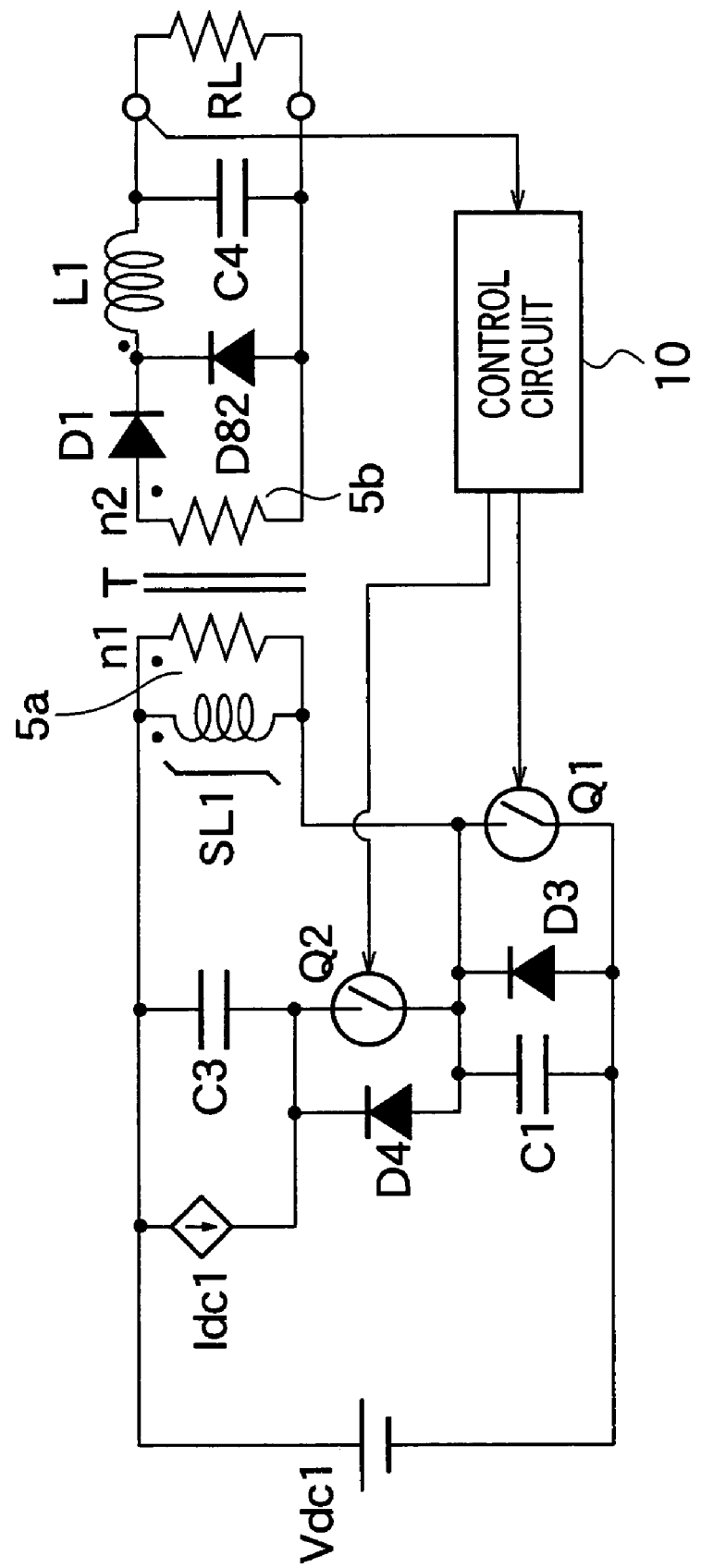
FIG. 30 is a circuit diagram showing a DC converter according to an eighth embodiment.

FIG. 30 is a circuit diagram showing a DC converter according to an eighth embodiment. The DC converter according to the eighth embodiment shown in FIG. 30 differs from the DC converter according to the first embodiment shown in FIG. 5 in that a reactor (fourth reactor) L1 is connected between a diode D1 and a capacitor C4 and a diode D82 is connected to a node between the diode D1 and a first end of the reactor L1 and to a second end of a secondary winding 5b. The primary side of the transformer T is the same as that of the first embodiment, and therefore, will not be explained.

A core of the transformer T is wound with a primary winding 5a and the secondary winding 5b (the number of turns being n2) that is in the same phase as the primary winding 5a. A first end of the secondary winding 5b is connected to the diode D1 (corresponding to a first rectifying element of the present invention). The node between the diode D1 and the first end of the reactor L1 and the second end of the secondary winding 5b are connected to the diode D82 (corresponding to a second rectifying element of the present invention). The diodes D1 and D82 form a rectifying circuit. A second end of the reactor L1 and the second end of the secondary winding 5b are connected to a capacitor C4 (corresponding to a smoothing circuit of the present invention). The capacitor C4 smoothes a voltage of the reactor L1 and provides a DC output to a load RL.

Figure 31:
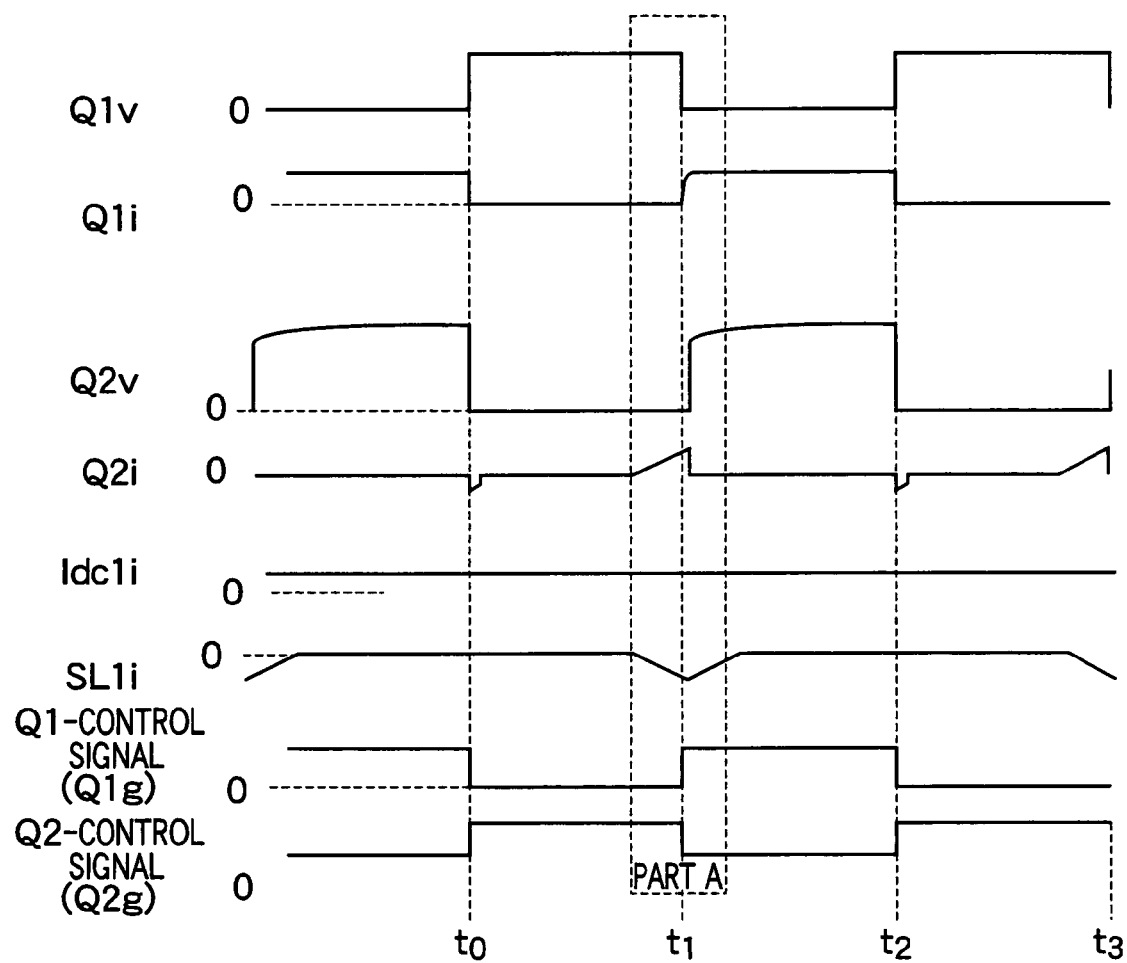
FIG. 31 is a timing chart showing signals at various parts of the DC converter according to the eighth embodiment.
Figure 32:
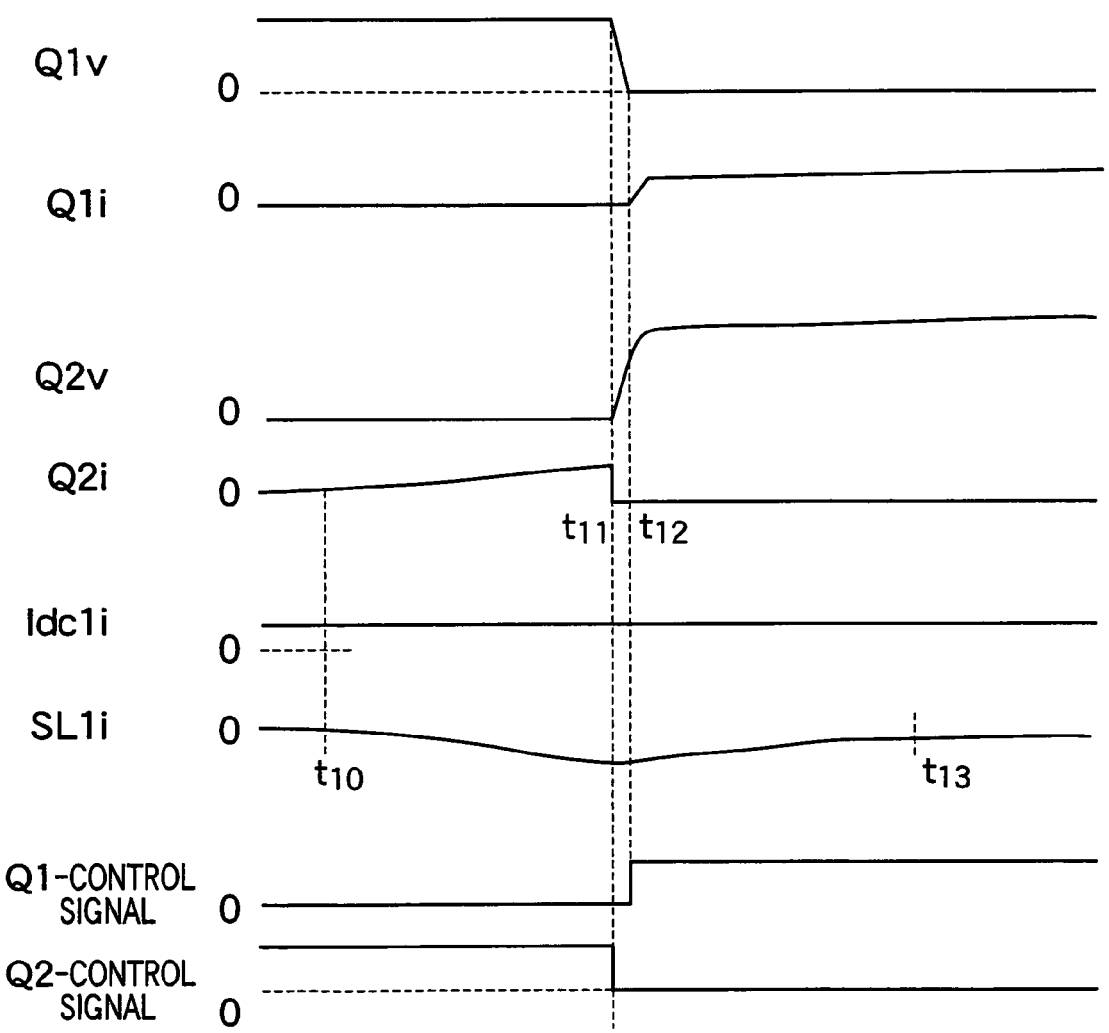

Operation of the DC converter according to the eighth embodiment with the above-mentioned configuration will be explained with reference to FIGS. 31 and 32. FIG. 31 is a timing chart showing signals at various parts of the DC converter according to the eighth embodiment. FIG. 32 is a timing chart showing the details of the signals at the various parts when a switch Q1 is turned on. The B-H characteristic of the transformer of the DC converter and the timing chart of a current of a saturable reactor of the DC converter are the same as those of the first embodiment shown in FIGS. 9 and 10.

FIGS. 31 and 32 show a terminal voltage Q1v of the switch Q1, a current Q1i passing through the switch Q1, a terminal voltage Q2v of a switch Q2, a current Q2i passing through the switch Q2, a current Idc1i passing through a power supply source Idc1, and a current SL1i passing through the saturable reactor SL1.

At time t1 (corresponding to t11 to t12), the switch Q1 is turned on. Then, a current passes in order of Vdc1, 5a, Q1, and Vdc1. At the same time, the secondary winding 5b of the transformer T generates a voltage to pass a current in order of 5b, D1, L1, C4, and 5b. When the switch Q1 is turned on, the saturable reactor SL1 passes the current SL1i to accumulate energy in an inductor of the saturable reactor SL1.

The current SL1i changes, as shown in FIG. 10, to a current value a (negative value) at time t1, to a current value b (negative value) at time t1b, to a current value c (zero) at time t13, and to a current value d (positive value) at time t2. On the B-H curve shown in FIG. 9, magnetic flux changes in order of Ba, Bb, Bc, and Bd. Ba to Bg shown in FIG. 9 correspond to a to g shown in FIG. 10.

At time t2, the switch Q1 is turned off. Then, the energy accumulated in the saturable reactor SL1 charges a capacitor C1. At this time, the inductance of the saturable reactor SL1 and the capacitor C1 form a voltage resonance to steeply increase the voltage Q1v of the switch Q1. A current passes in order of L1, C4, D82, and L1 to supply a current through the capacitor C4 to the load RL.

When the potential of the capacitor C1 becomes equal to the potential of a capacitor C3, the discharge of energy of the saturable reactor SL1 makes a diode D4 conductive to pass a diode current that charges the capacitor C3. At this time, the switch Q2 is turned on so that the switch Q2 becomes a zero-voltage switch. From time t2 to time t20, the current SL1i changes from the current value d (positive value) to a current value e (zero). On the B-H curve shown in FIG. 9, magnetic flux changes from Bd to Be.

Simultaneously with the energy discharge of the saturable reactor SL1, energy from a power supply source Idc1 is supplied to the capacitor C3, which is charged. Namely, the capacitor C3 cumulatively receives both the energy from the power supply source Idc1 and the energy from the saturable reactor SL1. Upon the completion of the energy discharge of the saturable reactor SL1 and the energy discharge of the power supply source Idc1, the charging of the capacitor C3 stops.

From time t20 to time t3, the energy accumulated in the capacitor C3 flows in order of C3, Q2, SL1, and C3 to reset the magnetic flux of the saturable reactor SL1. The magnetic flux of the transformer T that is connected in parallel with the saturable reactor SL1 similarly changes.

From time t20 to time t3, the energy accumulated in the capacitor C3 is returned to the saturable reactor SL1, and therefore, the current SL1i passed to the saturable reactor SL1 becomes negative as shown in FIG. 10. Namely, the current SL1i changes from the current value e (zero) to a current value f (negative value) in the period from t20 to t2a. On the B-H curve shown in FIG. 9, magnetic flux changes from Be to Bf. An area S from time t2 to time t20 is equal to an area S from time t20 to time t2a. The area S corresponds to the energy of the saturable reactor SL1 accumulated in the capacitor C3.

From time t2a to time t3, the current SL1i changes from the current value f (negative value) to a current value g (negative value). On the B-H curve shown in FIG. 9, magnetic flux changes from Bf to Bg. An area from time t2a to time t3 corresponds to the energy of the power supply source Idc1 accumulated in the capacitor C3.

Namely, the energy accumulated in the capacitor C3 is the sum of the energy of the saturable reactor SL1 and the energy of the power supply source Idc1, and therefore, the current SL1i is increased by the energy supplied from the power supply source Idc1 at the time of resetting. As a result, magnetic flux moves to the third quadrant to reach the saturation region (Bf to Bg) to increase the current SL1i, which becomes the maximum at time t3 (similar to time t1). The current SL1i increases to a saturation current of the saturable reactor SL1 just before the end of an ON period of the switch Q2.

At time t3, the current Q2i of the switch Q2 reaches the maximum. At this time, the switch Q2 is turned off to steeply discharge the capacitor C1, which quickly becomes zero. At this time, the switch Q1 is turned on to achieve zero-voltage switching.

Figure 33:
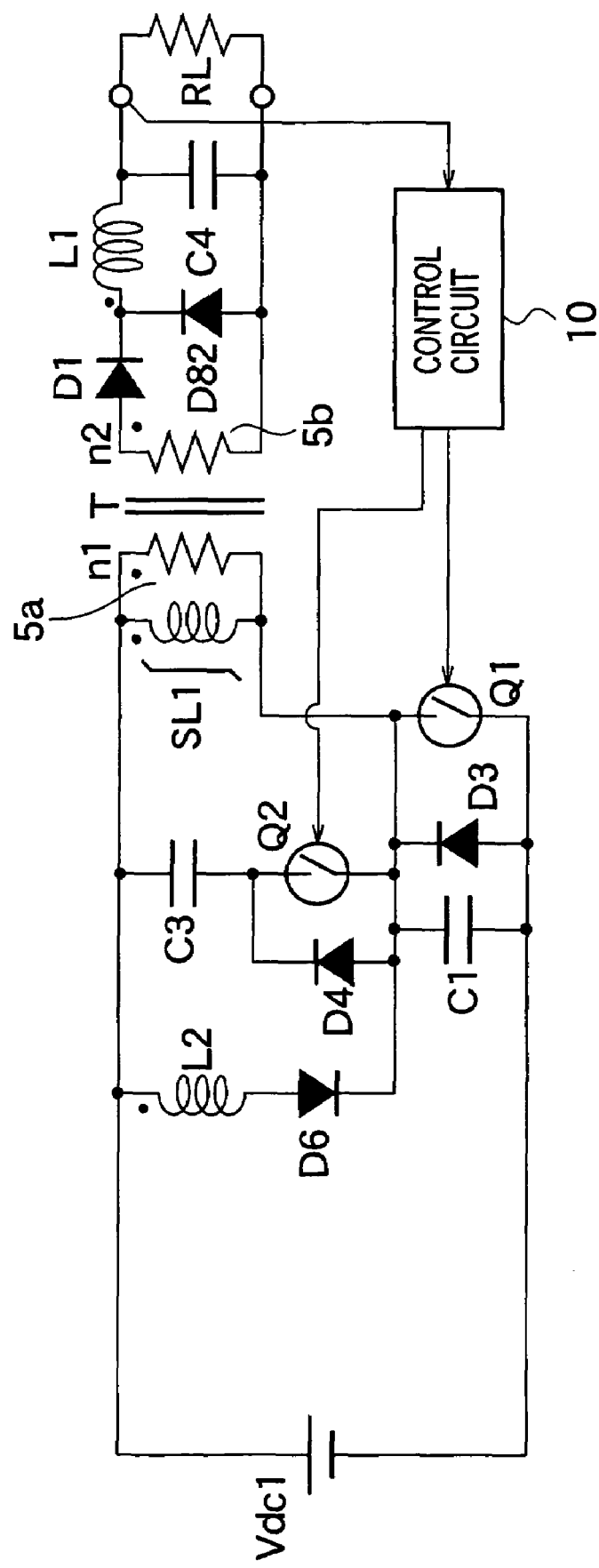
FIG. 33 is a circuit diagram showing a first example of the DC converter according to the eighth embodiment.

FIG. 33 is a circuit diagram showing the details of the DC converter according to the eighth embodiment. The eighth embodiment shown in FIG. 33 forms the power supply source Idc1 from a series circuit composed of a reactor L2 and a diode D6.

According to this embodiment, the reactor L2 accumulates energy when the switch Q1 is turned on, and when the switch Q1 is turned off, the energy accumulated in the reactor L2 is supplied to the capacitor C3 to charge the capacitor C3. The power supply source Idc1 shown in FIG. 33 is appropriate for light load.

First Modification

Figure 34:
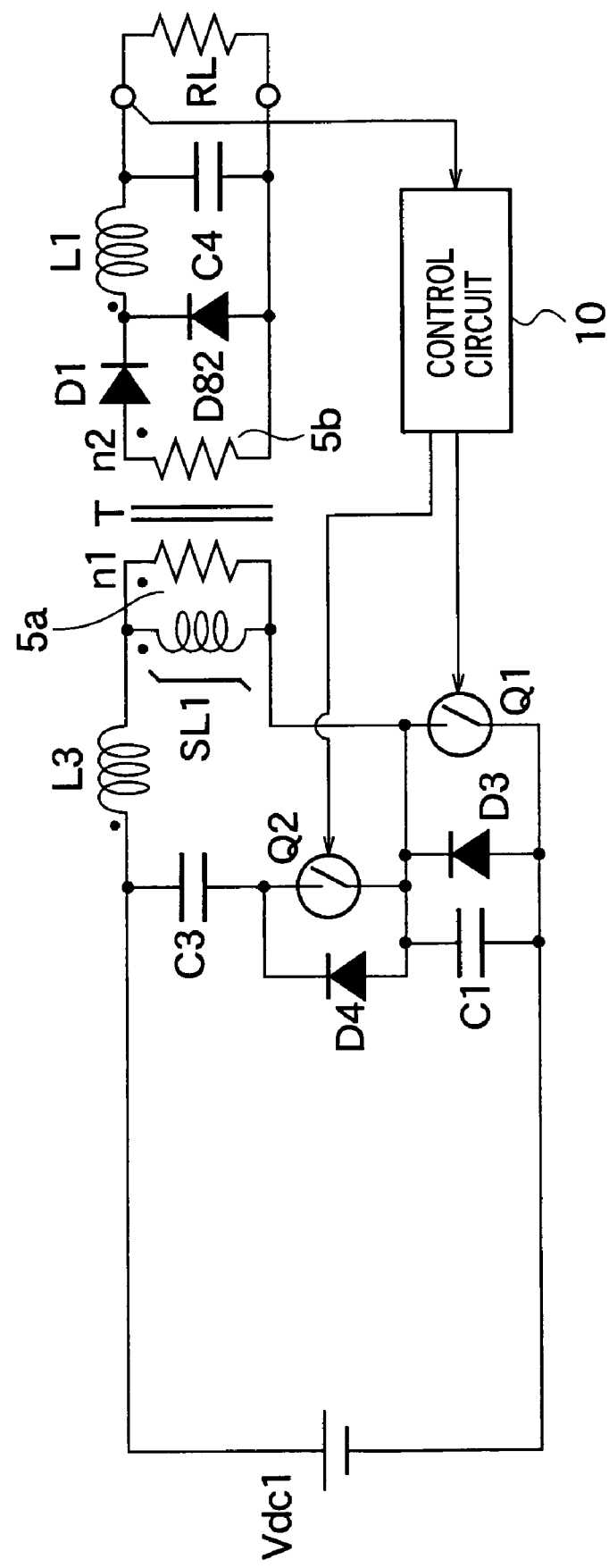
FIG. 34 is a circuit diagram showing a first modification of the DC converter according to the eighth embodiment.

FIG. 34 is a circuit diagram showing a first modification of the DC converter according to the eighth embodiment. The first modification shown in FIG. 34 forms the power supply source Idc1 from a reactor L3 that is connected in series with the primary winding 5a of the transformer T.

According to the first modification, the switch Q1 is turned on to pass a current through the reactor L3 and accumulate energy in the reactor L3. When the switch Q1 is turned off, the energy is discharged in order of L3, 5a (SL1), D4, C3, and L3. The energy is partly supplied through the secondary winding 5b of the transformer T to the load RL and is partly supplied to the capacitor C3 to charge the capacitor C3. The power supply source Idc1 shown in FIG. 34 is appropriate for heavy load.

Second Modification

Figure 35:
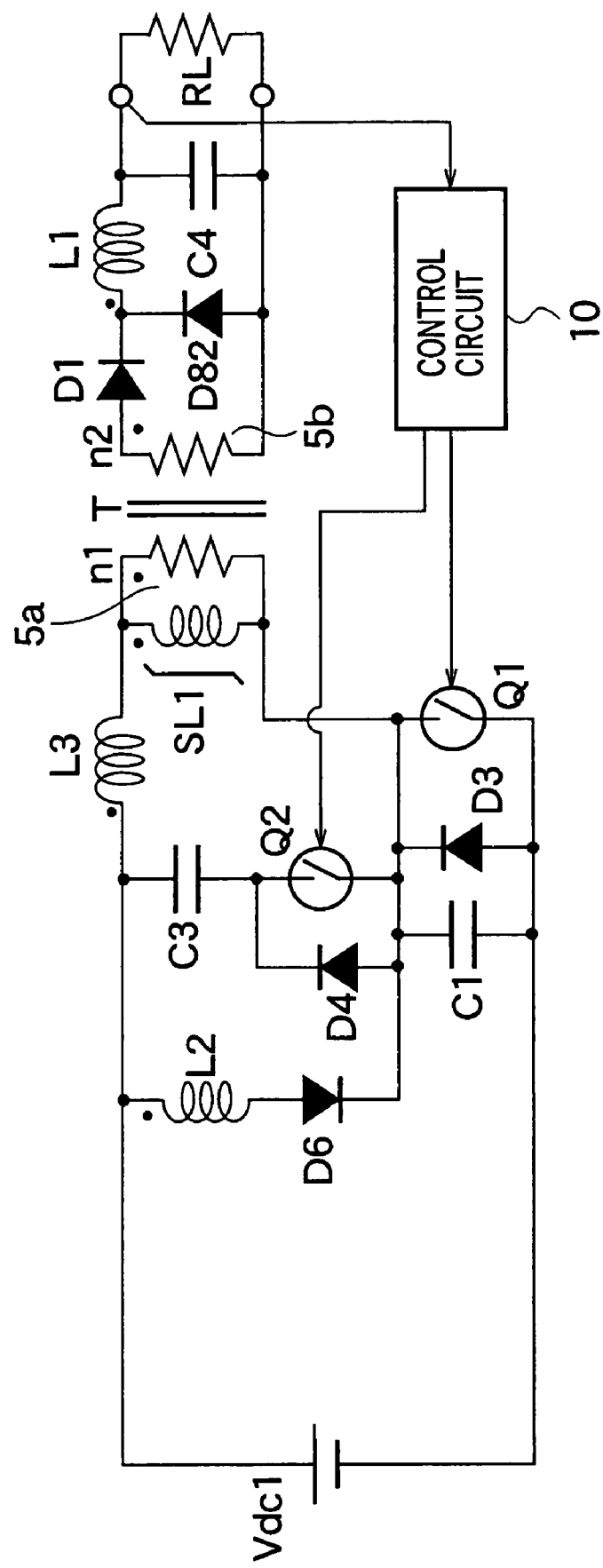
FIG. 35 is a circuit diagram showing a second modification of the DC converter according to the eighth embodiment.

FIG. 35 is a circuit diagram showing a second modification of the DC converter according to the eighth embodiment. The second modification shown in FIG. 35 combines the reactor L2 and diode D6 serving as the power supply source Idc1 of FIG. 33 with the reactor L3 serving as the power supply source Idc1 of FIG. 34, to cope with light load and heavy load.

The reactor L3 may be replaced with a leakage inductor of the transformer T. The saturable reactor SL1 may be replaced with an excitation inductance of the transformer T if the transformer employs a core having a good saturation characteristic. This circuit can control an output voltage with a fixed switching frequency to perform PWM control, thereby easily coping with a broadcasting interference and the like.

Ninth Embodiment

Figure 36:
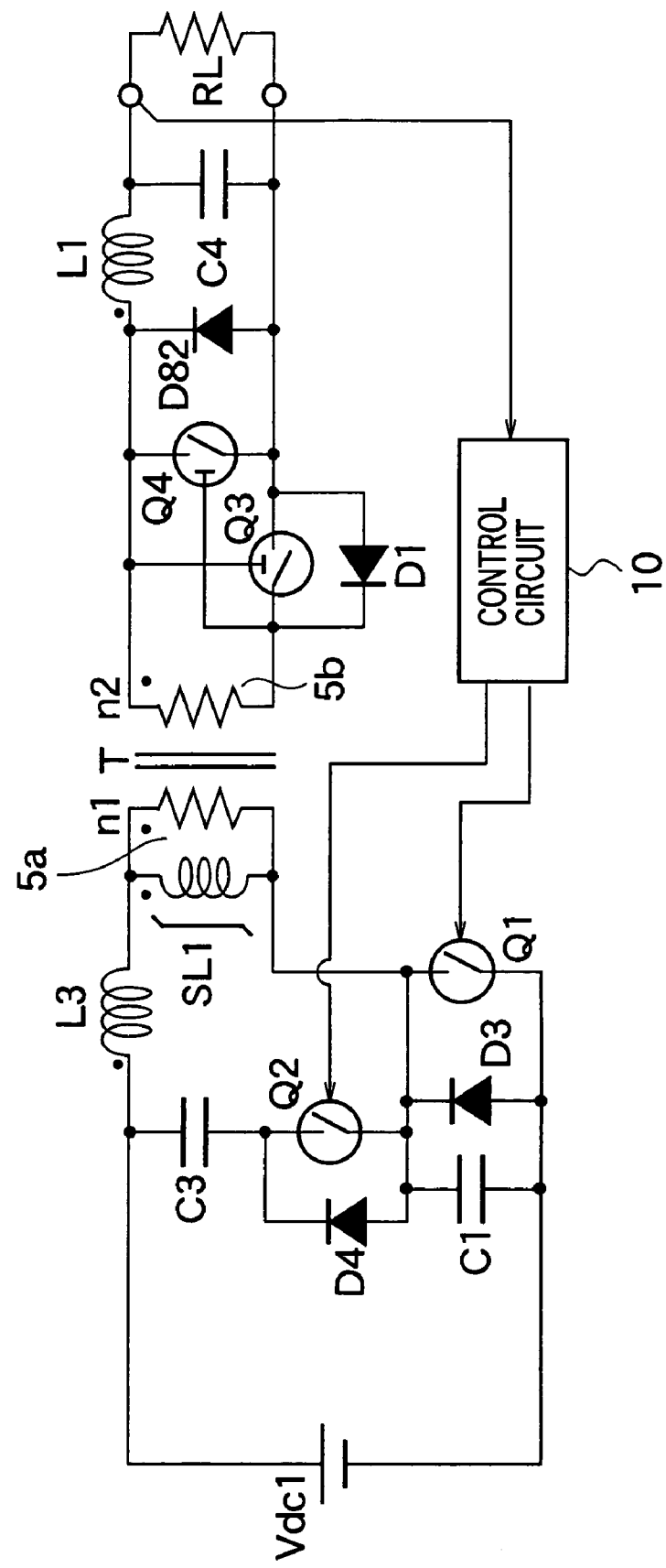
FIG. 36 is a circuit diagram showing a DC converter according to a ninth embodiment.

A DC converter according to a ninth embodiment employs a synchronous rectifier in a secondary circuitry of a transformer. The transformer outputs a rectangular waveform, and the embodiment increases a conduction ratio for synchronous rectification, to reduce a rectifier loss for a low output voltage and improve rectification efficiency. FIG. 36 is a circuit diagram showing the DC converter according to the ninth embodiment.

The DC converter shown in FIG. 36 is the same as the DC converter according to the first modification of the eighth embodiment shown in FIG. 34 except the structure of the secondary circuitry of the transformer T. Accordingly, the same parts are represented with the same reference marks, and only the structure of the secondary circuitry of the transformer T will be explained.

Both ends of a secondary winding 5b of the transformer T are connected to a switch Q3 made of a FET and a switch Q4 made of a FET, the switches Q3 and Q4 being connected in series. A first end (marked with a dot) of the secondary winding 5b of the transformer T is connected to a gate of the switch Q3, and a second end of the secondary winding 5b of the transformer T is connected to a gate of the switch Q4. The switch Q3 is connected in parallel with a diode D1, and the switch Q4 is connected in parallel with a diode D82. These elements form a synchronous rectifying circuit.

Both ends of the switch Q4 are connected in series with a reactor L1 and a capacitor C4. This rectifying/smoothing circuit rectifies and smoothes a voltage (on/off-controlled pulse voltage) induced on the secondary winding 5b of the transformer T and provides a DC output to a load RL.

A control circuit 10 turns on and off switches Q1 and Q2 alternately. When an output voltage of the load RL becomes equal to or greater than a reference voltage, the ON-width of a pulse applied to the switch Q1 is narrowed and the ON-width of a pulse applied to the switch Q2 is widened. Namely, when an output voltage of the load RL becomes equal to or greater than the reference voltage, the ON-width of a pulse applied to the switch Q1 is narrowed to maintain a constant output voltage.

Figure 37:
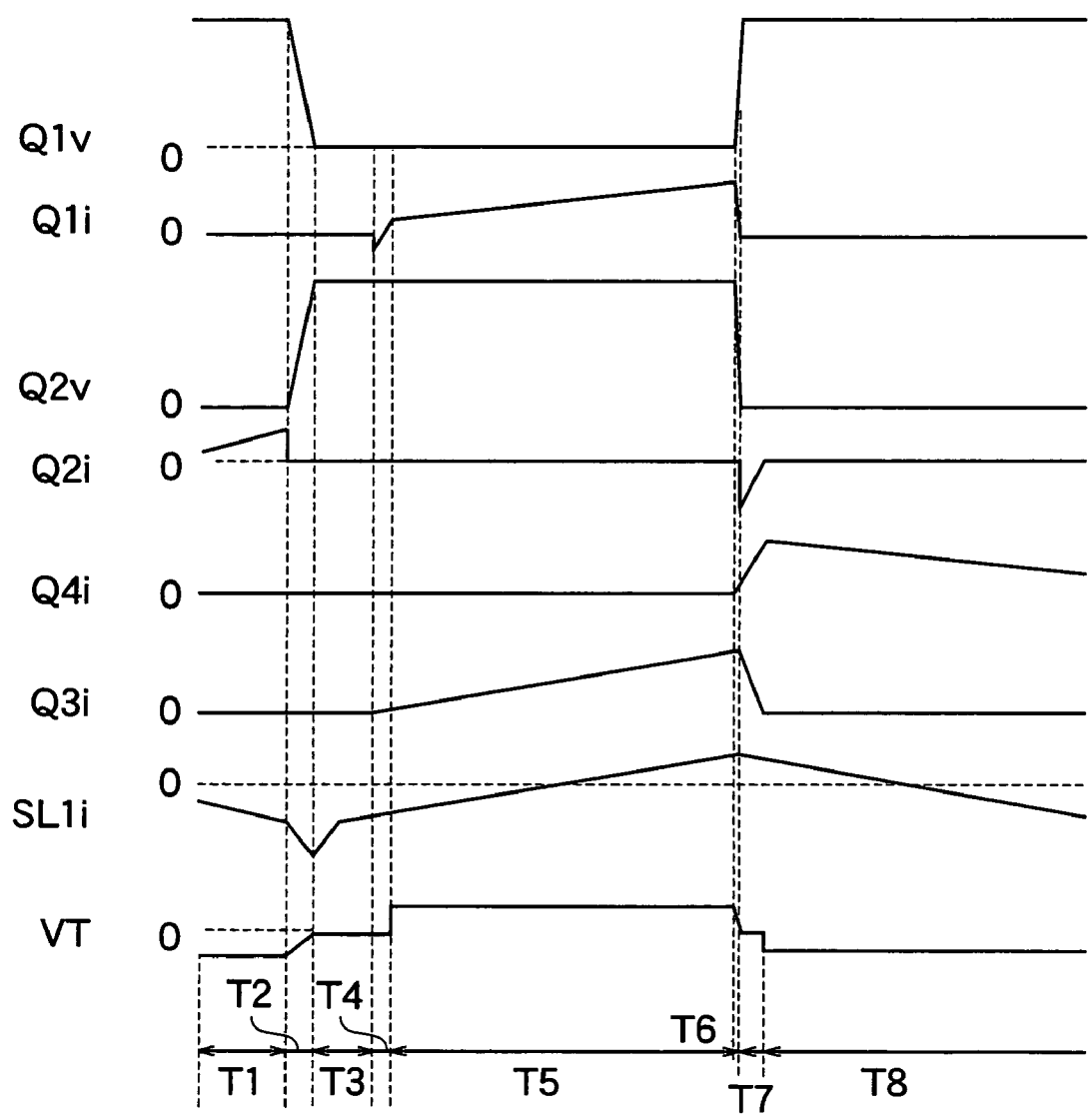
FIG. 37 is a timing chart showing signals at various part of the DC converter according to the ninth embodiment.

Operation of the DC converter according to the ninth embodiment with the above-mentioned configuration will be explained with reference to a timing chart shown in FIG. 37. In FIG. 37, Q1v is a terminal (drain-source) voltage of the switch Q1, Q1i is a current (drain current) passing through the switch Q1, Q2v is a terminal voltage of the switch Q2, Q2i is a current passing through the switch Q2, Q3i is a current passing through the switch Q3, Q4i is a current passing through the switch Q4, SL1i is a current passing through a saturable reactor SL1, and VT is a terminal voltage of the secondary winding 5b of the transformer T.

In period T1 (corresponding to time t0 to t1 in FIG. 31 and time t2 to time t3 in FIG. 31), the switch Q1 is OFF and the switch Q2 is ON. As a result, the switch Q2 passes a current and the switch Q1 passes no current. At this time, the primary winding 5a of the transformer T generates a counter electromotive force (negative on the side marked with a dot of the primary winding 5a and positive on the other side). Due to the counter electromotive force, the secondary winding 5b generates voltage (negative on the side marked with a dot of the secondary winding 5b and positive on the other side). As a result, the positive voltage is applied to the gate of the switch Q4 to turn on the switch Q4, and the negative voltage is applied to the gate of the switch Q3 to turn off the switch Q3. A current is passed in order of L1, C4, Q4, and L1, and energy in the reactor L1 is supplied to the load RL.

In a period from T2 to T4 (corresponding to time t1 in FIG. 31), the switch Q2 is changed from the ON state to an OFF state, and the switch Q1 is changed from the OFF state to an ON state. Accordingly, the inductance of a reactor L3, the saturation inductance of the saturable reactor SL1, and a capacitor C1 resonate. The resonance decreases the voltage of the switch Q1 and increases the voltage of the switch Q2 (period T2). When the switch Q1 drops close to a zero voltage (period T3), the switch Q1 is turned on, and a current is passed through the switch Q1 (period T4).

In period T5 (corresponding to time t1 to time t2 in FIG. 31), the switch Q1 is ON and the switch Q2 is OFF. At this time, a DC power source Vdc1 supplies a current through the primary winding 5a of the transformer T to the switch Q1 to accumulate energy in the primary winding 5a (positive on the side marked with a dot of the primary winding 5a and negative on the other side). This energy generates voltage on the secondary winding 5b (positive on the side marked with a dot of the secondary winding 5b and negative on the other side). Accordingly, the positive voltage is applied to the gate of the switch Q3 to turn on the switch Q3, and the negative voltage is applied to the gate of the switch Q4 to turn off the switch Q4. Then, a current is passed in order of 5b, L1, C4, Q3, and 5b to supply DC power to the load RL. When the switch Q1 is turned on, the saturable reactor SL1 passes the current SL1i to accumulate energy in the inductor of the saturable reactor SL1.

In period T6 (corresponding to time t2 of FIG. 31), the switch Q1 is changed from the ON state to an OFF state. In the period T6, the inductance of the reactor L3, the inductance of the saturable reactor SL1, and the resonant capacitor C1 resonate. The resonance steeply increases the voltage of the switch Q1.

In period T7 (corresponding to time t2 of FIG. 31), a diode D4 turns on after the switch Q1 is turned off, and the diode D4 passes a current. As a result, energy in the saturable reactor SL1 and energy in the reactor L3 are accumulated through the diode D4 in the snubber capacitor C3. During the ON period of the diode D4, the switch Q2 is turned on so that the switch Q2 functions as a zero-voltage switch.

In this way, the DC converter according to the ninth embodiment provides the effect of the eighth embodiment. In addition, the ninth embodiment employs the synchronous rectifier in the secondary circuitry of the transformer T. The transformer outputs a rectangular waveform, which is applied to the gate of the synchronous rectifying element to make it conductive substantially during the whole period. Then, no current passes through the parallel-connected diode, and therefore, the rectification is carried out without loss. This is effective for a low output voltage such as 5 V or 3.3 V.

The invention claimed is:

1. A DC converter comprising:
a first series circuit being connected in parallel with a DC power source and including a primary winding of a transformer and a first switch that are connected in series;
a first return circuit being connected to the first series circuit and including a second switch and a snubber capacitor that are connected in series and configured to return energy accumulated in a saturable reactor;
the saturable reactor connected in parallel with the primary winding of the transformer and configured to operate in a saturation region when the second switch is in an ON state;
a rectifying/smoothing circuit connected in parallel with a secondary winding of the transformer and including a rectifying element and a smoothing element; and
a control circuit to turn on and off the first and second switches alternately.

2. The DC converter of claim 1 further comprising:
a power supply source to accumulate power when the first switch is ON and supply the power to the snubber capacitor when the first switch is OFF,
the first return circuit being connected in parallel with any one of the first switch and primary winding,
the control circuit turning off the second switch when a current to the second switch increases.

3. The DC converter of claim 2, wherein the saturable reactor is realized by using the saturation characteristic of a core of the transformer.

4. The DC converter of claim 2, wherein the power supply source comprises a second series circuit connected to a first end of the DC power source and a node between the first switch and the second switch and including a first reactor and a diode that are connected in series.

5. The DC converter of claim 2, wherein the power supply source comprises a second reactor connected in series between the DC power source and the primary winding of the transformer.

6. The DC converter of claim 5, wherein the second reactor comprises a leakage inductor of the transformer.

7. The DC converter of claim 4, wherein the secondary winding of the transformer comprises a plurality of secondary windings that are wound around a core of the transformer and are separated away from each other, each of the secondary windings being provided with the rectifying/smoothing circuit having the rectifying element and smoothing element.

8. The DC converter of claim 7, wherein the primary winding of the transformer is loosely coupled with each of the secondary windings, and the secondary windings are tightly coupled with each other.

9. The DC converter of claim 2, wherein a magnetic path of a core of the transformer is locally provided with a cross-sectional-area-reduced part.

10. The DC converter of claim 2, wherein:
the DC power source comprises an AC power source and an input rectifying circuit connected to the AC power source to rectify an AC voltage;
a series circuit is connected between a first output terminal and a second output terminal of the input rectifying circuit, the series circuit comprising an input smoothing capacitor and a rush current limiting resistor that is connected in series with the input smoothing capacitor, to reduce a rush current of the input smoothing capacitor when the AC power source is turned on;
the first switch comprises a normally-ON-type switch that is connected through the primary winding of the transformer to the first output terminal of the input rectifying circuit; and
the control circuit turns off the first switch with a voltage generated by the rush current limiting resistor when the AC power source is turned on, and after the input smoothing capacitor is charged, starts a switching operation to turn on and off the first switch.

11. The DC converter of claim 10, wherein the transformer further includes an auxiliary winding, and the DC converter further comprises a normal operation power source to supply a voltage generated by the auxiliary winding of the transformer to the control circuit.

12. The DC converter of claim 10, further comprising:
a semiconductor switch connected in parallel with the rush current limiting resistor,
the control circuit turning on the semiconductor switch after starting the switching operation of the first switch.

13. The DC converter of claim 1, wherein:
the first switch of the first series circuit is connected through a third reactor to the primary winding; and
a second return circuit is connected to the transformer, to return energy accumulated in the third reactor to the secondary side of the transformer.

14. The DC converter of claim 13, wherein the second return circuit includes an auxiliary transformer connected in series with the transformer, to return the energy accumulated in the third reactor when the first switch is ON to the secondary side when the first switch is OFF.

15. The DC converter of claim 14, further comprising:
a power supply source to accumulate power when the first switch is ON and supply the power to the snubber capacitor when the first switch is OFF,
the first return circuit being connected in parallel with any one of the first switch and primary winding, and
the control circuit turning off the second switch when a current to the second switch increases.

16. The DC converter of claim 14, wherein the third reactor comprises a leakage inductor between the primary winding and secondary winding of the transformer that are loosely coupled around a core of the transformer, the primary winding of the transformer and the secondary winding of the auxiliary transformer being wound around the core of the transformer and being tightly coupled with each other.

17. The DC converter of claim 13, wherein the saturable reactor is realized by the saturation characteristic of a core of the transformer.

18. The DC converter of claim 15, wherein the power supply source comprises a second series circuit connected to a first end of the DC power source and a node between the first switch and the second switch and including a first reactor and a diode that are connected in series.

19. The DC converter of claim 15, wherein the power supply source comprises a second reactor connected in series with the primary winding of the transformer.

20. The DC converter of claim 19, wherein the second reactor comprises a leakage inductor of the transformer.

21. The DC converter of claim 13, wherein at least one tertiary winding is wound around a core of the transformer and is loosely coupled with the primary winding of the transformer, and each of the tertiary windings is provided with the rectifying/smoothing circuit having the rectifying element and smoothing element.

22. The DC converter of claim 13, wherein a magnetic path of a core of the transformer is locally provided with a cross-sectional-area-reduced part.

23. The DC converter of claim 14, wherein the rectifying/smoothing circuit further comprises:
a third switch connected to a node between a first end of the secondary winding of the transformer and a first end of a secondary winding of the auxiliary transformer and to a first end of the smoothing element, a control terminal of the third switch being connected to a second end of the secondary winding of the auxiliary transformer; and
a fourth switch connected to the second end of the secondary winding of the auxiliary transformer and the first end of the smoothing element, a control terminal of the fourth switch being connected to the first end of the secondary winding of the auxiliary transformer.

24. The DC converter of claim 13, wherein:
the DC power source comprises an AC power source and an input rectifying circuit connected to the AC power source to rectify an AC voltage;
a series circuit is connected between a first output terminal and a second output terminal of the input rectifying circuit, the series circuit comprising an input smoothing capacitor and a rush current limiting resistor that is connected in series with the input smoothing capacitor, to reduce a rush current of the input smoothing capacitor when the AC power source is turned on;
the first switch comprises a normally-ON-type switch that is connected through the primary winding of the transformer to the first output terminal of the input rectifying circuit; and
the control circuit turns off the first switch with a voltage generated by the rush current limiting resistor when the AC power source is turned on, and after the input smoothing capacitor is charged, starts a switching operation to turn on and off the first switch.

25. The DC converter of claim 24, wherein the transformer further includes an auxiliary winding, and the DC converter further comprises a normal operation power source to supply a voltage generated by the auxiliary winding of the transformer to the control circuit.

26. The DC converter of claim 24, further comprising:
a semiconductor switch connected in parallel with the rush current limiting resistor,
the control circuit turning on the semiconductor switch after starting the switching operation of the first switch.

27. The DC converter of claim 1, further comprising:
a power supply source to accumulate power when the first switch is ON and supplies the power to the snubber capacitor when the first switch is OFF,
the first return circuit being connected in parallel with any one of the first switch and primary winding,
the rectifying/smoothing circuit including a second rectifying element connected in parallel with the secondary winding of the transformer through the rectifying element and a fourth reactor connected between the rectifying element and the smoothing element,
the control circuit turning off the second switch when a current to the second switch increases.

28. The DC converter of claim 1, further comprising:
a power supply source to accumulate power when the first switch is ON and supplies the power to the snubber capacitor when the first switch is OFF,
the first return circuit being connected in parallel with any one of the first switch and primary winding,
the rectifying/smoothing circuit including:
a fourth reactor connected between the smoothing element and the secondary winding of the transformer;
a third switch connected in parallel with the rectifying element and having a control terminal connected to a second end of the secondary winding and a fourth switch connected in parallel with a series circuit of the third switch and secondary winding and having a control terminal connected to a first end of the secondary winding; and
a second rectifying element connected in parallel with the secondary winding of the transformer through the third switch,
the control circuit turning off the second switch when a current to the second switch increases.

29. The DC converter of claim 27, wherein the saturable reactor is realized by using the saturation characteristic of a core of the transformer.

30. The DC converter of claim 27, wherein the power supply source comprises a second series circuit connected to a first end of the DC power source and a node between the first switch and the second switch and including a first reactor and a diode that are connected in series.

31. The DC converter of claim 27, wherein the power supply source comprises a second reactor connected in series between the DC power source and the primary winding of the transformer.

32. The DC converter of claim 31, wherein the second reactor comprises a leakage inductor of the transformer.

33. The DC converter of claim 27, wherein a magnetic path of a core of the transformer is locally provided with a cross-sectional-area-reduced part.

34. The DC converter of claim 1, wherein the control circuit turns on the first switch within a predetermined period from the time when the voltage of the first switch becomes zero due to resonance between a resonant capacitor connected in parallel with the first switch and the saturation inductance of the saturable reactor.

35. The DC converter of claim 5, wherein the secondary winding of the transformer comprises a plurality of secondary windings that are wound around a core of the transformer and are separated away from each other, each of the secondary windings being provided with the rectifying/smoothing circuit having the rectifying element and smoothing element.

36. The DC converter of claim 35, wherein the primary winding of the transformer is loosely coupled with each of the secondary windings, and the secondary windings are tightly coupled with each other.

37. The DC converter of claim 28, wherein the saturable reactor is realized by using the saturation characteristic of a core of the transformer.

38. The DC converter of claim 28, wherein the power supply source comprises a second series circuit connected to a first end of the DC power source and a node between the first switch and the second switch and including a first reactor and a diode that are connected in series.

39. The DC converter of claim 28, wherein the power supply source comprises a second reactor connected in series between the DC power source and the primary winding of the transformer.

40. The DC converter of claim 39, wherein the second reactor comprises a leakage inductor of the transformer.

41. The DC converter of claim 28, wherein a magnetic path of a core of the transformer is locally provided with a cross-sectional-area-reduced part.

* * * * *